United States Patent [19]

Saito et al.

[11] 4,313,659
[45] Feb. 2, 1982

[54] ELECTROMAGNETICALLY DRIVEN SLIT EXPOSURE SHUTTER

[75] Inventors: Syuichiro Saito; Ryoichi Suzuki, both of Kawasaki; Takashi Uchiyama, Yokohama, all of Japan

[73] Assignee: Canon Kabushiki Kaisha, Tokyo, Japan

[21] Appl. No.: 142,750

[22] Filed: Apr. 22, 1980

[30] Foreign Application Priority Data

Apr. 27, 1979 [JP]  Japan .................................. 54-52419

[51] Int. Cl.³ .............................................. G03B 9/42
[52] U.S. Cl. .................................... 354/234; 354/245; 354/246; 354/248

[58] Field of Search ............... 354/234, 133, 245, 248, 354/246; 335/302, 303

[56] References Cited

U.S. PATENT DOCUMENTS 4,051,499  9/1977  Kondo ................................. 354/234
4,088,405  5/1978  Pustka ................................ 354/234

Primary Examiner—L. T. Hix
Assistant Examiner—S. D. Schreyer
Attorney, Agent, or Firm—Toren, McGeady & Stanger

[57] ABSTRACT

In the slit exposure shutter disclosed, front and rear shutter blades carry permanent magnets along a passage of electromagnets which are excited to repel the permanent magnets and cause the blades to float in the gaps of the electromagnets.

11 Claims, 17 Drawing Figures

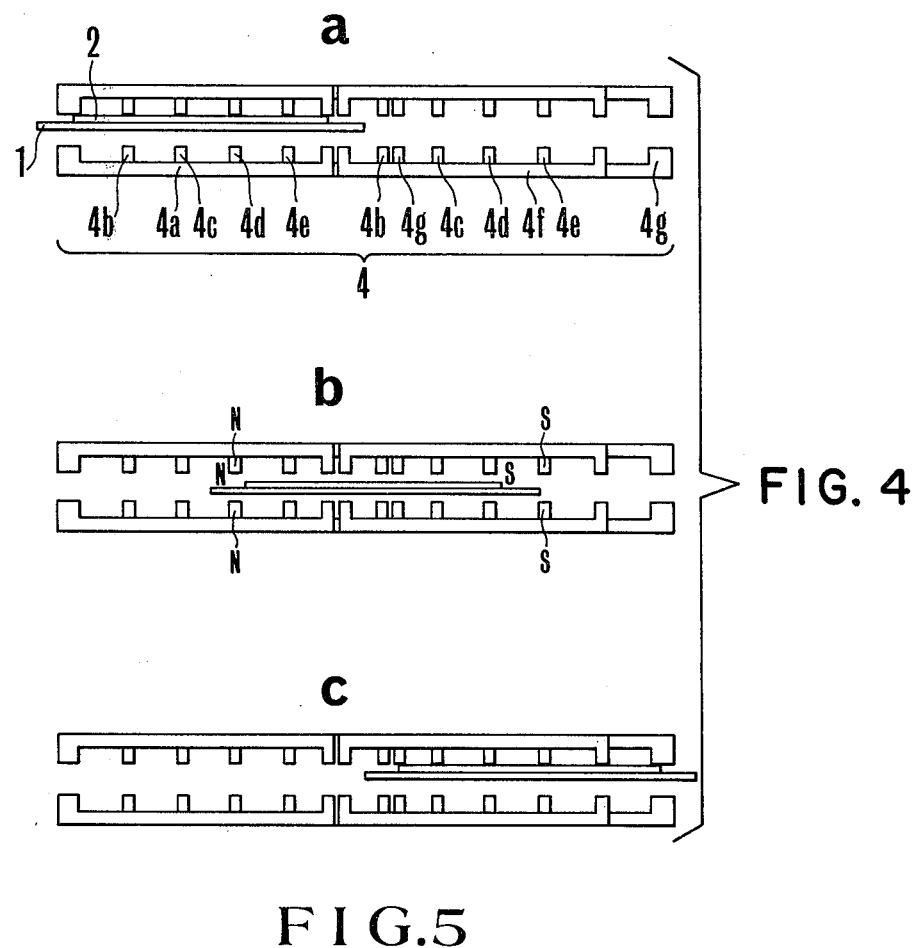
FIG. 4
FIG. 5
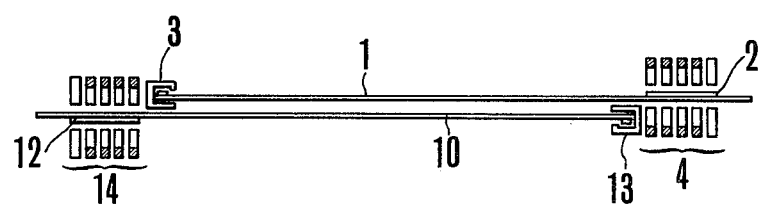

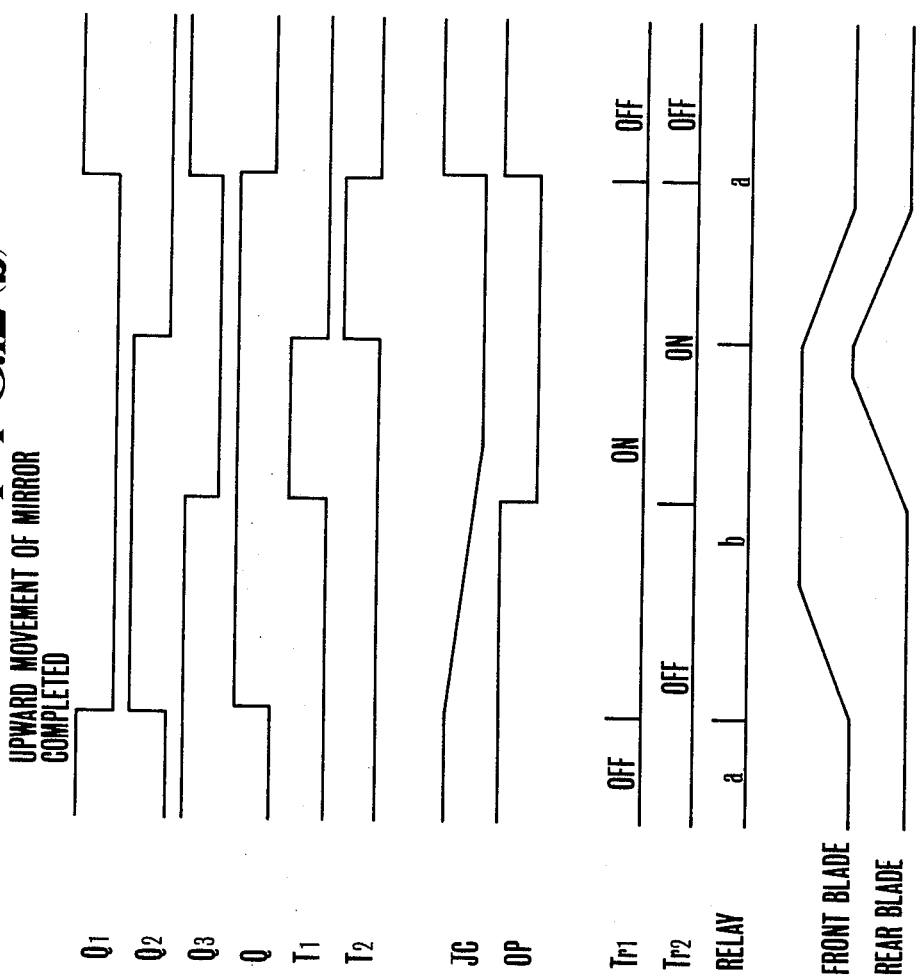

ELECTROMAGNETICALLY DRIVEN SLIT EXPOSURE SHUTTER

BACKGROUND OF THE INVENTION

1. Field of the Invention

This invention relates to a slit exposure shutter for a camera, such as a focal plane shutter, and more particularly to an electromagnetically driven slit exposure shutter which is driven by an electromagnetic force to make an exposure effecting travel and a return travel.

2. Description of the Prior Art

The recent advancement of applications of electronics to cameras has prompted the use of electronic circuits for light measurement, exposure control, information display, etc. However, in most cases, the shutter blades are still arranged to be driven by the force of a spring which is arranged to be charged by a winding-up operation. Particularly, in the case of a focal plane shutter which must be driven by a relatively large driving force, a mechanical driving force is often used in view of the problem that would be presented by the limited capacity of a battery usable within the camera for electrically driving the shutter instead of mechanical driving. The focal plane shutter which is arranged to be operated by a mechanical force in this manner, however, requires the use of a complex mechanism for driving shutter blades and thus is disadvantageous in terms of reduction in size of a camera. It has been, therefore, a general desire to have the shutter of this type arranged to be electromagnetically driven and this desire has come to be responded by an increased number of proposals.

On the other hand, it is general desire that a camera is compact in size for sufficient portability. This requirement necessitates the use of a small battery which does not have sufficient capacity as power source for supplying a power to an electromagnetic device to be incorporated in the camera. As for the electromagnetic device, it is necessary to use a compact device which does not have a sufficiently high efficiency in the electric-to-mechanical energy conversion required. Accordingly, where the shutter blades must be electromagnetically driven instead of mechanical driving, the driving force available naturally becomes smaller than a mechanical driving force.

The present invention is directed to the solution of the above stated problem presented by the conventional electromagnetically driven shutter.

SUMMARY OF THE INVENTION

It is therefore a general object of the invention to provide an electromagnetically driven slit exposure shutter which is arranged to lessen a frictional force by lifting up into a floating state the blades of the shutter to permit the shutter blades to travel at a sufficiently high speed even where an insufficient driving force is available from an electromagnetic driving arrangement. Further, in combination with this arrangement to lessen friction by magnetic floating, there is provided a holding means which electromagnetically prevents displacement of the shutter blades from being inadvertently caused while they are not travelling.

To attain the above stated object, the slit exposure shutter of the invention is arranged as follows: The shutter blades are driven by an electromagnetic drive source for their exposure effecting travels and their return travels. Each of the front and rear shutter blades is formed by a non-magnetic thin plate with a thin plate-shaped permanent magnet secured to a part of the non-magnetic thin plate. Along the travelling path of the front and rear blades, there are fixedly arranged a plurality of electromagnets which are disposed along the travelling route of the front and rear shutter blades and arranged to confront both magnetic poles of the permanent magnets. These electromagnets are excited one after another according as the shutter blades travel. The front and rear blades are allowed to travel by the mutual repellent forces produced between the magnetic poles of the electromagnets and those of the permanent magnets. During their travels, each blade is arranged to travel in a floating manner about the middle parts of the gaps of the magnetic poles of the electromagnets. When the shutter blades are in repose, i.e. when the electromagnets are not excited, the permanent magnets are attracted to the yokes of the electromagnets to hold and inhibit the blades from travelling. With the slit exposure shutter of the invention arranged in this manner, friction can be lessened to save 30-40% of a driving force otherwise required. Therefore, a sufficient high speed travel can be performed with the insufficient driving force available from a small battery of a small capacity. In addition to that, the shutter blades can be prevented from inadvertent displacement which tends to happen while the camera is not in use or while it is being carried. Further, in cases where each of the front and rear blades of the invented slit exposure shutter is a group consisting of a plurality of blades, the thin plate-shaped permanent magnets are disposed only on one front blade and one rear blade that end an exposure operation to attain the above stated advantages and also to lessen the space required for accommodating the shutter. Besides, such arrangement makes the operation of a shutter of this type accurate.

In accordance with the invention, the thin plate-shaped permanent magnet which is to be secured to the shutter blade may be magnetized either in the direction of the travel of the blade or in the direction of the thickness of the blade. Further, the electromagnets may be supplied with an electric power either in a manner to have propelling forces exerted simultaneously on the N and S poles of the magnet magnetized in the travelling direction or in a manner to have the propelling forces exerted alternately on them.

Among the group of electromagnets, the electromagnets which are disposed at the ends of their alignments are arranged to have a suitable shape while there are provided stoppers which are arranged such that upon completion of the exposure effecting travels and return travels of these blades, the blades are stopped at points in which these end electromagnets and the permanent magnets secured to the blades are in such relative positions as to obtain sufficiently great repellent forces from excitation of the electromagnets for their next travels.

Further, in the slit exposure shutter of the present invention, in order to effect a power supply to these electromagnets one after another for exposure effecting and return travels, there are provided photo-couplers, sliding brushes or the like which are employed as means for detecting the positions of the shutter blades and are arranged to operate on opposite phases for the exposure effecting and return travels of the shutter blades.

The group of the electromagnets of the invented shutter may be either separately arranged for driving the front blade and the rear blade or may be arranged to have a part of the group used in common for driving the front and rear blades.

The above and further objects, features and advantages of the invention will be apparent from following detailed description of embodiments thereof taken in connection with the accompanying drawings.

BRIEF DESCRIPTION OF THE DRAWINGS

FIGS. 4(a), 4(b), and 4(c) are schematic illustrations of the relative positions of the yokes of electromagnets and the front blade, the illustration FIG. 4(a) showing the front blade of the shutter as in a charged state, the illustration FIG. 4(b) showing it as in a travelling state and the illustration FIG. 4(c) showing it as in a state of having completed its travel.

FIG. 5 is an illustration showing the arrangement of the front and rear shutter blades and a driving device for them as embodiment of the invention.

FIG. 12(b) is a timing chart showing the operation of the circuit shown in FIG. 12(a).

DETAILED DESCRIPTION OF THE PREFERRED EMBODIMENTS

Figure 1:
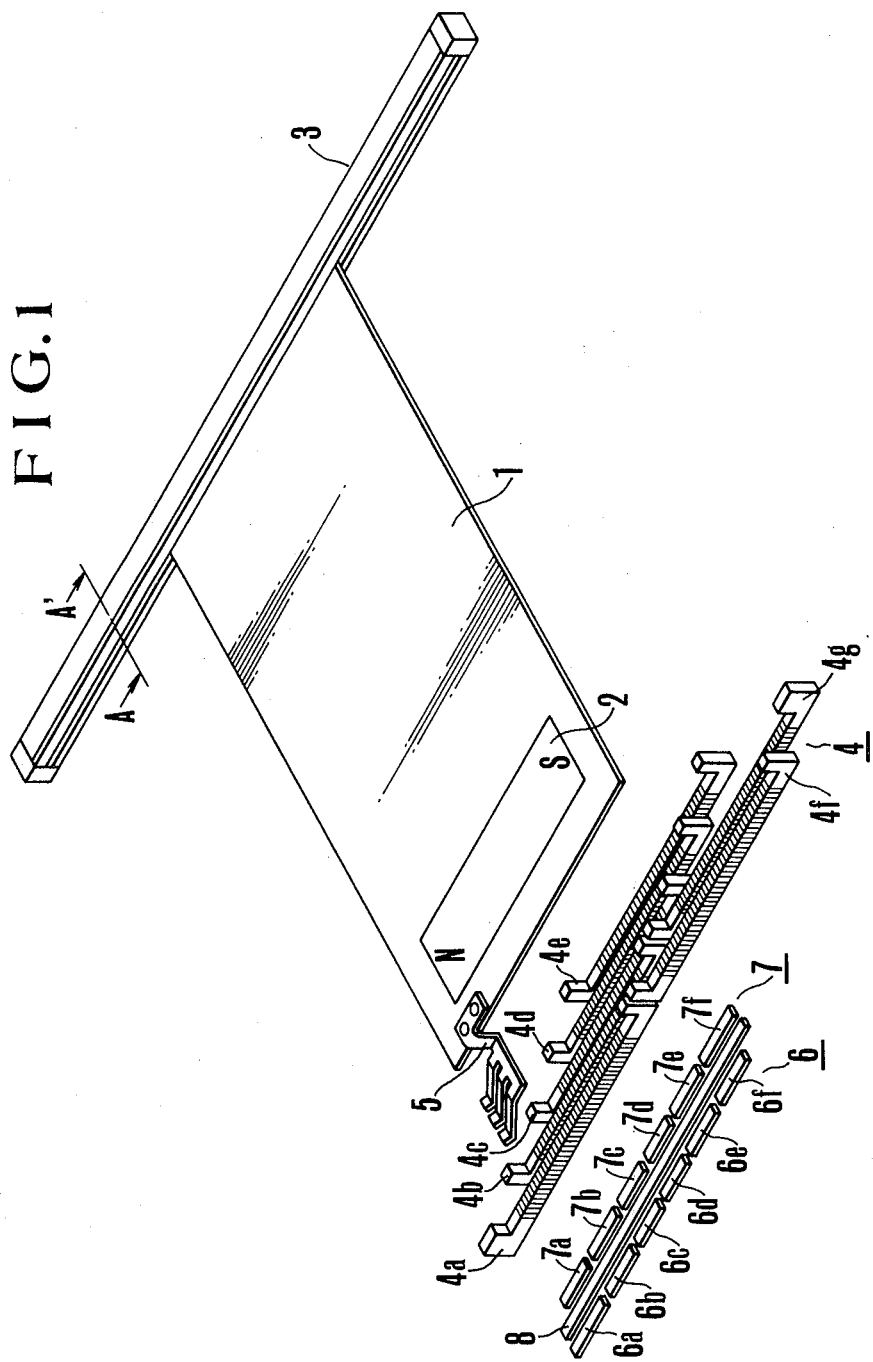
FIG. 1 is an oblique view showing an electromagnetically driven slit exposure shutter as embodiment of the invention.
Figure 2:
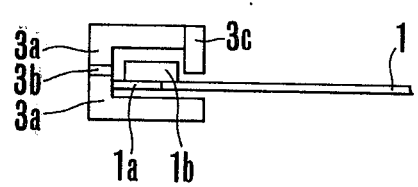
FIG. 2 is a sectional view taken on line A-A' of FIG. 1.
Figure 3:
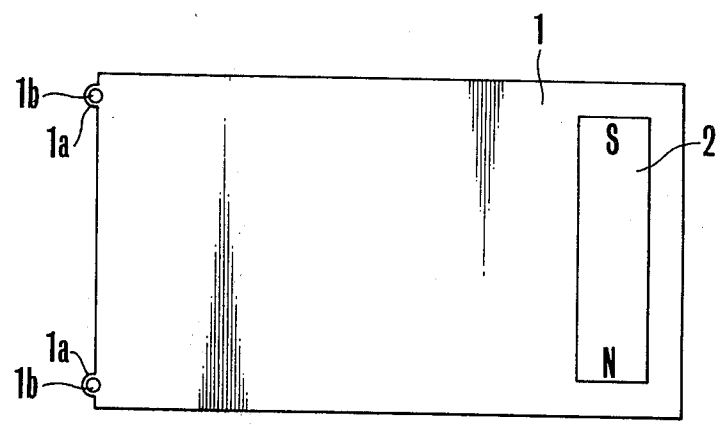
FIG. 3 is a plan view showing the front blade of the shutter of the present invention.

FIG. 1 is an exploded oblique view showing an embodiment of the invented electromagnetically driven slit exposure shutter, which is composed of one front blade and one rear blade. However, for simplification of illustration, there is shown only the front blade while the rear blade is omitted from the illustration. FIG. 2 is a sectional view taken on line A-A' shown in FIG. 1 while FIG. 3 is a plan view showing the front shutter blade shown in FIG. 1. Referring to FIG. 1, FIG. 2 and FIG. 3, the front blade 1 is formed into a thin plate shape having a light shielding property and being provided with a thin plate-shaped permanent magnet 2. The permanent magnet 2 is magnetized in the direction of the travel of the front blade 1. The permanent magnet has its N pole on the left side and its S pole on the right side thereof. There is provided a guide part 3 which includes a guide frame 3a formed to have a permanent magnet 3b sandwiched thereby. The permanent magnet 3b is magnetized in the vertical direction. The guide frame 3a serves as yoke which forms a magnetic circuit for the permanent magnet 3b. A reference numeral 3c indicates a guide plate made of a non-magnetic material. In the portion of the front blade 1 inserted in the guide part, there is formed protrudent parts 1a. A cylindrical permanent magnet 1b which has its axis disposed perpendicularly to the travelling direction of the blade is attached to each of the protrudent parts 1a. The permanent magnets 1b are magnetized in the direction of the thickness of the front blade. The permanent magnet 3b and the yoke 3a produce a magnetic flux within the gap inside of the guide part 3 in the direction perpendicular to the front blade 1. A magnetic flux which is produced from each of the permanent magnets 1b is arranged to be in the direction reverse to this magnetic flux. Therefore, the permanent magnet 1b is caused to be floated by a magnetic repellent force without coming into contact with any of the upper and lower yokes. In the direction perpendicular to the travelling direction of the front blade 1, the front blade 1 is guided by the protrudent parts 1a and the cylindrical permanent magnets 1b. Therefore, with this arrangement, the front blade 1 travels with very little friction. A numeral 4 indicates a front blade driving part comprising electromagnets 4a, 4b, 4c, 4d, 4e, 4f and 4g each of which is prepared by winding a coil round a C shaped yoke. In each of the electromagnets 4b, 4c, 4d, 4e and 4f, the distance between the centers of the yoke along the yoke surface is equal to the length of the permanent magnet 2. Each electromagnet is arranged to confront the permanent magnet 2 and is equally spaced away from another along the travelling path of the front blade 1. In each of the electromagnets 4a and 4g, the distance between yoke centers along the yoke surface is arranged to be slightly longer than the length of the permanent magnet 2. For the simplification of illustration, there is shown only one set of the electromagnets 4a-4g. However, in the actual arrangement of the shutter, there is provided another set of the electromagnets which is disposed to have the front blade and the permanent magnet 2 interposed in between the two sets which are symmetrically arranged relative to a plane. The yoke surfaces of one set of the electromagnets are arranged to confront those of the other set of the electromagnets with a sufficient space left between the two sets to permit the front blade 1 and the permanent magnet 2 to freely travel there. The windings of the upper and lower electromagnets are connected in parallel and are arranged to permit simultaneous power supply thereto. The direction of the windings are such that, when the power is supplied, the confronting magnetic poles become of the same polarity. Parts 5, 6, 7 and 8 constitute a slide switch which is arranged to effect a power supply to the coils of the electromagnets one after another and switching over between them. A slide piece 5 is secured to the front blade 1. A group 6 of pieces 6a–6f for an exposure effecting travel are respectively connected to the coils of the electromagnets 4a–4f through change-over relay switches. A group 7 of pieces for return travel (resetting travel) includes pieces 7a–7f which are connected to the coils of the electromagnets 4b–4g respectively through the change-over relay switches. A common piece 8 is connected to the plus power source side of the driving circuit. The slide piece 5 is arranged to slide on the group 6 of pieces for effecting an exposure, the group 7 of pieces for resetting and the common piece 8. During an exposure effecting operation, power supply to coils is performed by the group 6 of the exposure effecting pieces, the slide piece 5 and the common piece 8. Then, for resetting, power supply to coils is performed by the group 7 of the resetting pieces, the slide piece 5 and the common piece 8. The switching-over between the exposure effecting piece group 6 and the resetting piece group 7 is effected by means of a change-over switch, which will be described in detail hereinafter. The operation of the shutter is as follows: Referring to FIG. 4 which schematically illustrates the operation of the shutter, FIG. 4(a) shows the shutter as in a state of being charged; FIG. 4(b) shows it as in a travelling state; and FIG. 4(c) shows it in a state of having completed the travel of the front blade. Under the shutter charging condition, the front blade driving part 4 is not receiving any power supply. The yoke of each electromagnet is not magnetized by its coil. Therefore, the permanent magnet 2 attached to the front blade 1 has its left and right ends (N and S poles) attracted either by the yoke of the leftmost electromagnet 4a or by that of a corresponding upper electromagnet disposed above it to keep the front blade in position. Then, with the shutter released, the electromagnet 4a and the corresponding upper electromagnet receives a power supply from the driving circuit through the exposure effecting piece 6a, the slide piece 5 and the common piece 8. With the pair of corresponding upper and lower electromagnets having received a power supply to their electromagnetic coils, their confronting magnetic poles have the same polarity and their left magnetic poles become N poles while their right magnetic poles become S poles. Accordingly, both ends (N and S poles) of the permanent magnet 2 are repelled by all of the magnetic poles of the upper and lower electromagnets and the permanent magnet 2 is thus caused to float in the air. Under the shutter charging condition, the right end of the permanent magnet 2 is arranged to be positioned in the middle of the attracting yoke face by means of a stopper which is not shown in the drawing. Meanwhile, the left end of the permanent magnet 2 is arranged to be positioned at a point deviating rightward from the middle of the attracting yoke face there, which is of a narrow oblong shape. Therefore, concurrently with floating of the permanent magnet 2 in the air, a rightward force is exerted at the left end of the permanent magnet 2 to cause the permanent magnet 2 and the front blade 1 to travel to the right. When the left and right ends of the permanent magnet 2 reach the middle points of the yoke faces of the next electromagnet 4b, the slide piece 5 disengages from the exposure effecting piece 6a and comes into contact with another exposure effecting piece 6b to have the electromagnet 4b and a corresponding upper electromagnet excited. Then, the left yoke face becomes an N pole and the right yoke face an S pole. The permanent magnet 2 is repelled by the upper and lower magnetic poles to be afloat in the air and thus keeps on travelling rightward by inertia. When the left and right ends of the permanent magnet 2 come to deviate from the center of each yoke face, a rightward force is again exerted to accelerate the travelling speed of the permanent magnet 2 and the front blade 1. When the electromagnets are energized one after another from the left side of their alignment in this manner, the front blade 1 is caused to begin its travel to effect an exposure. The electromagnet pairs are thus energized from the left one after another. However, there is provided no corresponding exposure effecting piece for the last pair of electromagnets which are the electromagnet 4g and a corresponding upper electromagnet. Therefore, when the slide piece 5 comes away from the exposure effecting piece 6f, the front blade driving part 4 is no longer energized to leave the front blade 1 travelling by inertia. When the left end of the permanent magnet 2 comes to the center of the left yoke face of the electromagnet 4g, the front blade 1 is stopped by a stopper which is not shown. Then, the permanent magnet 2 is attracted by the yokes of the electromagnet 4g or those of the corresponding upper electromagnet to keep the front shutter blade there. A power supply to the rear blade driving part begins a predetermined period of time after the commencement of the power supply to the front blade driving part 4. Then, the rear blade is operated in the same manner as the front blade 1 to complete an exposure. After the exposure, the shutter is reset by using the group 7 of resetting pieces. Under the front blade holding condition after completion of the exposure, the slide piece 5, the resetting piece 7f and the common piece 8 are arranged to be in contact with each other. In resetting the shutter, a power supply is effected to the electromagnet 4g and a corresponding upper electromagnet through these pieces. Each electromagnet receives a power supply in such a way as to have its left magnetic pole become an N pole and the right magnetic pole become an S pole both for the exposure effecting operation and the resetting operation. Upon receipt of the power supply, each of the electromagnet 4g and the upper electromagnet corresponding thereto has its left yoke face become an N pole and its right yoke face become an S pole. The permanent magnet 2 is repelled by these upper and lower yokes and thus comes to float in the air. When the front blade 1 is in a state of being held after completion of a travel, the left end of the permanent magnet 2 is located in the middle of the attracting yoke face while the right end of the permanent magnet is located at a point deviating to the left from the middle of another attracting yoke face. When the permanent magnet comes to float, therefore, a leftward force is exerted at the right end of the permanent magnet 2 to cause the permanent magnet 2 and the front blade 1 to begin to travel leftward and a resetting operation begins. Following this, the same process as the exposure effecting operation takes place to reset the front blade 1. In this case, the group of the electromagnets are energized one after another from right to left. However, for the last pair of the electromagnets, i.e. the electromagnet 4a and the upper one corresponding thereto, there is no resetting piece. Therefore, when the slide piece 5 comes away from the resetting piece 7a, the front blade driving part 4 no longer receives any power supply and the front blade continues to travel by inertia until it is stopped by a stopper which is not shown when the right end of it reaches the middle of the right yoke face of the electromagnet 4a. Then, the permanent magnet 2 is attracted either by the yokes of the electromagnet 4a or those of the upper electromagnet corresponding thereto and thus the front blade 1 is held there to complete the resetting operation. Resetting of the rear blade also begins concurrently with the commencement of the resetting travel of the front blade 1. In this particular embodiment, the time of effecting the power supply to the electromagnets is adjustable as desired by the positions and shapes of the pieces of the slide switch. Under the shutter charging condition, if the common piece 8 is in a state of being connected to the plus power source, the front blade 1 can be prevented from being caused to travel by some unexpected impact because: In such a case, the slide piece 5 immediately comes into contact with the resetting piece 7a to have the electromagnet 4b and the upper electromagnet corresponding thereto energized to exert a force on the permanent magnet 2 in the resetting direction, so that the permanent magnet and the shutter blade 1 are brought back into a shutter charging state. The rear blade is also prevented from travelling under this condition in exactly the same manner, so that the shutter can be prevented from causing a leakage of light.

FIG. 5 is a sectional view showing by way of example the actual arrangement of the shutter illustrated in FIG. 1. In FIG. 5, a reference numeral 10 indicates the rear blade; 12 indicates the permanent magnet thereof; 13 indicates a guide part; and 14 indicates a rear blade driving part. In this embodiment, the rear blade driving electromagnet group 14 is separately arranged from the front blade driving electromagnet group 4.

Figure 6:
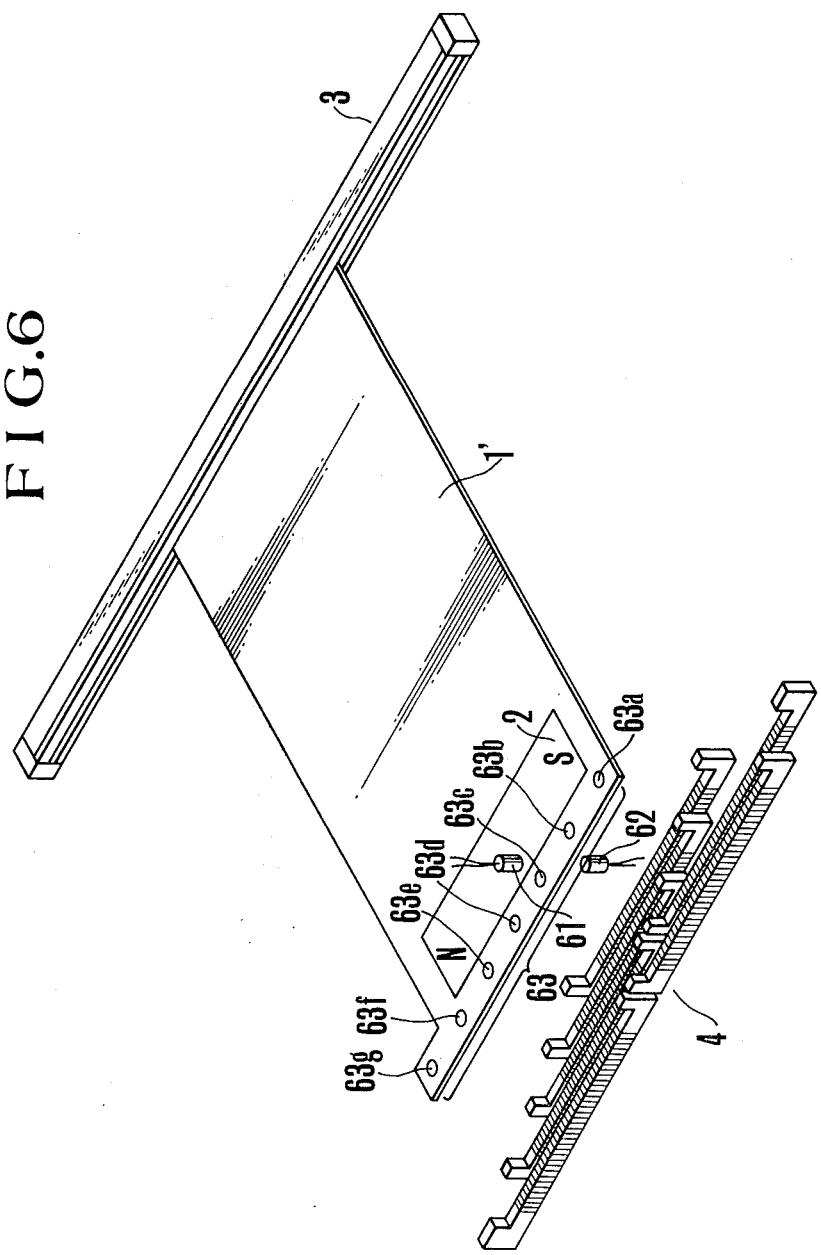
FIGS. 6 and 7 are oblique views showing other embodiments of the invented shutter.

FIG. 6 is an exploded oblique view showing another embodiment of the invention. In this embodiment, the shutter is also composed of one front blade and one rear blade. However, for the simplification of the illustration, FIG. 6 shows only the front blade while the rear blade is omitted from illustration.

In this embodiment, there is provided a photo-coupler for detecting the position of the shutter blade and the power supply to the electromagnets is controlled by the output of this photo-coupler. The front and rear blades are arranged to operate in exactly the same manner as in the preceding embodiment shown in FIG. 1. Referring to FIG. 6, the front blade 1' is formed into a thin plate shape having a light shielding property and has a permanent magnet 2 attached thereto. A numeral 61 indicates a light emitting element (LED) and 62 a light sensitive element (SPC). A numeral 63 indicates a group of holes for the photo-coupler including holes 63a–63g. Under a shutter charging condition, the center of the hole 63a, the center of the light emitting element 61 and that of the light sensitive element 62 coincide with one another to have the light sensitive element 62 irradiated with the light of the light emitting element 61. When the left and right ends of the permanent magnet 2 come to the middle parts of the yoke faces of the electromagnet 4b as a result of the travel of the shutter blade 1', the center of the light sensitive element 62 comes to coincide with those of the hole 63b and the light emitting element 61 and the light sensitive element 62 is irradiated with the light of the light emitting element 61. Following this, the centers of the light emitting element 61 and the light sensitive element 62 respectively come to coincide with the centers of the holes 63c, 63d, 63e and 63f according as the left and right ends of the permanent magnet 2 come to the middle parts of the yoke faces of the electromagnets 4c, 4d, 4e and 4f one after another. When the front blade 1' is in a state of being held after completion of its travel, the centers of the light emitting element 61, the hole 63g and the light sensitive element 62 coincide with one another. The details of the control over the power supply to the driving part by the output of the photo-coupler will be described hereinafter. The time for effecting a power supply to the electromagnets in this particular embodiment is adjustable as desired by arranging the holes for the photo-coupler to be long holes for quickening the power supply time and by using a delay circuit for the driving circuit for delaying the power supply time.

Figure 7:
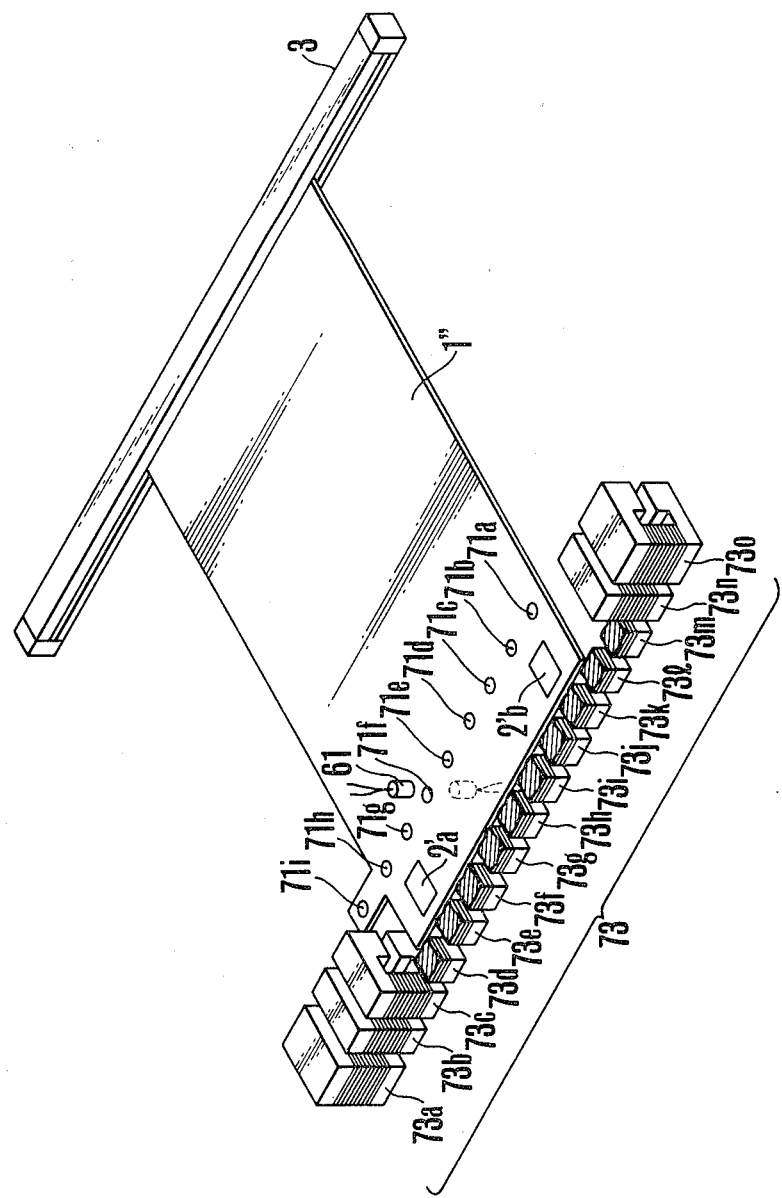

A further embodiment of the invention is as shown in the exploded oblique view of FIG. 7. The shutter shown in FIG. 7 is also composed of one front blade and one rear blade, though the latter is omitted from the illustration. The front blade 1'' is formed into a thin plate shape having a light shielding property and is provided with thin plate shaped permanent magnets 2'a and 2'b, which are magnetized in the direction of thickness of the blade 1''. Each of the permanent magnets has an N pole disposed on the upper side and an S pole on the lower side. A reference numeral 73 indicates a front blade driving part which comprises electromagnets 73a–73o. Each electromagnet is provided with a gap which permits the front blade 1'' and the permanent magnets 2'a and 2'b to travel through there. These electromagnets are arranged along the travelling path of the front blade 1'' to allow the front blade 1'' and the permanent magnets 2'a and 2'b to travel through their gaps. When a power supply is effected to each of the electromagnets, the upper gap face of it becomes an N pole while the lower gap face becomes an S pole. The distance between the centers of the yoke faces of each of pairs of electromagnets 73b and 73h, 73d and 73j, 73e and 73k, 73f and 73l, 73g and 73m and 73h and 73n is arranged to be equal to the distance between the centers of the permanent magnets 2'a and 2'b. When the power supply is effected, each of the pairs of electromagnets are simultaneously energized. The distance between the yoke face centers of the electromagnets 73a and 73g and that distance between the electromagnets 73i and 73o are arranged to be slightly larger than the distance between the centers of the permanent magnets 2'a and 2'b. Each of these pairs of electromagnets are also arranged to be simultaneously energized respectively. There is provided a group of photo-coupler holes 71 including holes 71a–71i. When the shutter is in a charged or preparatory state, a stopper which is not shown is arranged to have the center of the permanent magnet 2'b coincides with the yoke face center of the electromagnet 73g. Under this condition, the centers of a light emitting element 61, the hole 71a and a light sensitive element 62 are coinciding with each other. The centers of the light emitting element 61, the hole 71b and the light sensitive element 62 come to coincide with each other at a point where the center of the permanent magnet 2'a coincides with the yoke face center of the electromagnet 73b and, in the same manner thereafter, the center of each of the holes 71c, 71d, 71e, 71f, 71g, 71h and 71i comes to coincide with the centers of the light emitting element 61 and the light sensitive element 62 at points where the center of the permanent magnet 2'a comes to coincide with the yoke face centers of the electromagnets 73c, 73d, 73e, 73f, 73g, 73h and 73i one after another. When the front blade 1'' is in a state of being held after completion of its travel, a stopper which is not shown keeps the center of the permanent magnet 2'a in agreement with the yoke face center of the electromagnet 73i and the centers of the light emitting element 61, the hole 71i and the light sensitive element 62 are also in agreement with each other. The shutter arranged in this manner operates as follows:

When the shutter is in its charged or preparatory state, no power supply is effected to the front blade driving part 73 and the yoke of each electromagnet is not magnetized. The permanent magnets 2'a and 2'b are attracted by either the upper or lower yoke faces of the electromagnets 73a and 73g to have the front blade 1'' in a held state. The center of the permanent magnet 2'b is arranged to coincide with the center of the yoke face of the electromagnet 73g. However, the yoke face of the electromagnet 73a is formed to be long in the travelling direction of the front blade 1'' and have the center of the permanent magnet 2'a located at a point deviating rightward from the center of the yoke face of the electromagnet 73a. When a power supply is effected to the electromagnets 73a and 73g by the driving circuit in response to a shutter release operation, the electromagnets and the permanent magnets 2'a and 2'b have their magnetic poles of the same polarity confront one another. Then, the permanent magnets 2'a and 2'b are repelled by the upper and lower magnetic poles of the electromagnets and are thus caused to float in the air. Since the center of the permanent magnet 2'b coincides with the centers of the yoke faces of the electromagnet, the repellent forces thereon are exerted only in the vertical directions. Whereas, since the center of the other permanent magnet 2'a is located at a point deviating rightward from the centers of the yoke faces, a rightward force is exerted on the permanent magnet 2'a to cause the front blade 1" to travel to the right. This travel of the front blade 1" brings the permanent magnets 2'a and 2'b into the gaps of the next pair of the electromagnets 73b and 73h. The distance between the centers of the permanent magnets 2'a and 2'b is arranged to be equal to the distance between the yoke face centers of the electromagnets 73b and 73h. Further, the centers of the light emitting element 61, the hole 71b and the light sensitive element 62 are arranged to coincide with each other at a point where the centers of the permanent magnets 2'a and 2'b come to coincide with the yoke face centers of the electromagnets 73b and 73h. When the centers of the permanent magnets 2'a and 2'b come close to the yoke face centers of the electromagnets 73b and 73h, a signal is obtained from the photocoupler and a power supply is effected to the electromagnets 73b and 73h. Therefore, the magnetic poles of the electromagnets repel those of the permanent magnets to keep the front blade 1" afloat in the air and the front blade is allowed to continue its rightward travel by inertia. When the centers of the permanent magnets 2'a and 2'b come to the right hand sides of the yoke face centers of the electromagnets 73b and 73h, a rightward force is exerted there to increase the travelling speed of the front blade 1". The same processes are repeated one after another for the remainder of the travel of the front blade 1" with the power supply effected to one pair of electromagnets after another. The power supply to these electromagnets is thus effected one after another by the output of the photo-coupler according as the front blade travels. However, the last pair of the electromagnets 73i and 73o are not receiving any power supply. When the center of the permanent magnet 2'a comes close to the yoke face center of the electromagnet 73i, the light sensitive element 62 is irradiated through the hole 71i with the light of the light emitting element 61. This signal stops the power supply to the electromagnets 73h and 73n and does not cause any power supply to be effected to the next pair of electromagnets 73i and 73o. The front blade 1" is stopped by a stopper which is not shown when it comes to a point where the center of the permanent magnet 2'a coincides with the yoke face center of the electromagnet 73i. Then, the permanent magnets 2'a and 2'b are attracted either by the upper or lower yoke faces of the electromagnets 73i and 73o and the front blade is thus kept in a state of being held. A predetermined period after the commencement of the power supply to the front blade driving part 73, a power supply to the rear blade driving part begins and the rear blade operates in the same manner as the front blade to complete an exposure effecting operation. In resetting the shutter, a power is first supplied to the electromagnets 73i and 73o which are attracting the permanent magnets 2'a and 2'b. This causes the magnetic poles of the same polarity of the electromagnets 73i and 73o and the permanent magnets 2'a and 2'b to confront each other and thus to cause the permanent magnets to be repelled into a state of floating in the air. While the permanent magnet 2'a is subjected to only vertical repellent forces as its center is in agreement with the yoke face center of the corresponding electromagnet, a leftward force as well as vertical forces are exerted on the other permanent magnet 2'b because the center of the permanent magnet 2'b is located on the left hand side of the center of the yoke face of the electromagnet 73o which is of an oblong shape sidewise. Therefore, this leftward force causes the front blade 1" to begin to travel to the left. The subsequent processes take place in the same manner as in the exposure effecting operation before the front blade is reset. In this case, the group of the electromagnets are energized from right to left of their alignment one after another. However, the last pair of them 73a and 73g are not energized. Although the hole 71a permits the light of the light emitting element 61 to reach the light sensitive element 62, this stops the power supply to the electromagnets 73b and 73h but does not allow any power supply to the electromagnets 73a and 73g. When the front blade 1" reaches a resetting completion position, it is brought to a stop by a stopper which is not shown. Then, the permanent magnets 2'a and 2'b are attracted by either the upper or lower yoke faces of the electromagnets 73a and 73g. The front blade is thus brought into a state of being held to complete the resetting operation.

In the foregoing description, during the travel, the distance between the centers of the permanent magnets 2'a and 2'b are arranged to be equal to the distance between the yoke face centers of each pair of electromagnets to obtain a propellent force by allowing the permanent magnets 2'a and 2'b to simultaneously repel the magnetic poles of the electromagnets. However, instead of this arrangement, an arrangement to have the distance between the yoke face centers of each pair of electromagnets to be simultaneously energized shorter than the distance between the centers of the permanent magnets 2'a and 2'b will make the front blade travel more smoothly because this arrangement makes the time of having the propellent force work on the permanent magnet 2'b different from the time of having another propellent force work on the other permanent magnet 2'a.

Figure 8:
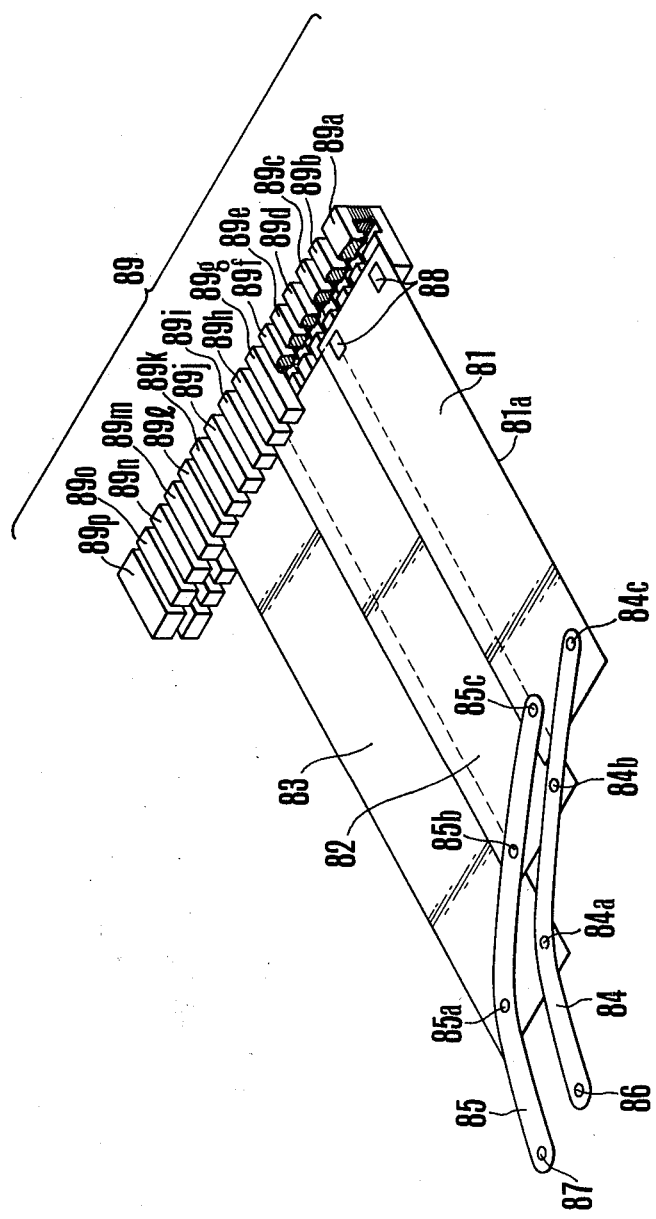
FIGS. 8 and 9 are oblique views showing as embodiments of the invention slit exposure shutters which are composed of a plurality of blades.

Another embodiment of the invention is as shown in FIG. 8 which is an exploded oblique view thereof. In this embodiment, each of the front and rear blade groups comprises a plurality of shutter blades and support arms which form a link mechanism for these blades. In each of the front and rear blade groups, permanent magnets are attached to a slit forming blade. For simplification of the illustration, FIG. 8 shows only the front blade group while the rear blade group is omitted from illustration. Among the front blades 81, 82 and 83, the blade 81 is a slit forming blade which is provided with a slit forming side 81a (an exposure effecting end). The slit forming blade 81 is provided with permanent magnets 88 which is magnetized in the direction of thickness of the blade. The blades 82 and 83 are light shielding blades. Reference numerals 84 and 85 indicate support arms each of which has one end thereof pivotally connected to a shutter base plate which is not shown through holes 86 and 87. The group of the front blades 81, 82 and 83 are rotatably attached to these support arms by pins 84a, 84b, 84c, 85a, 85b and 85c. There is provided a front blade driving part 89 which comprises a plurality of electromagnets. Each electromagnet is provided with a gap which gives a sufficient space for permitting the slit forming blade 81, the permanent magnets 88 and the light shielding blades 82 and 83 to freely travel there. These electromagnets are arranged along the travelling path of the group of front blades. The operating principle of the front blade group is similar to that of the preceding embodiment shown in FIG. 7. Therefore, the details of the operating principle are omitted from description here. The power supply to each electromagnet is controlled either by a slide switch or a photo-coupler.

In cases where each of the front and rear blade groups comprises a plurality of blades as shown in FIG. 8, if permanent magnets are attached to all of the blades respectively, the magnet of each blade might come to interfere with the magnet of the slit forming blade or might produce a propelling force in the reverse direction.

Figure 9:
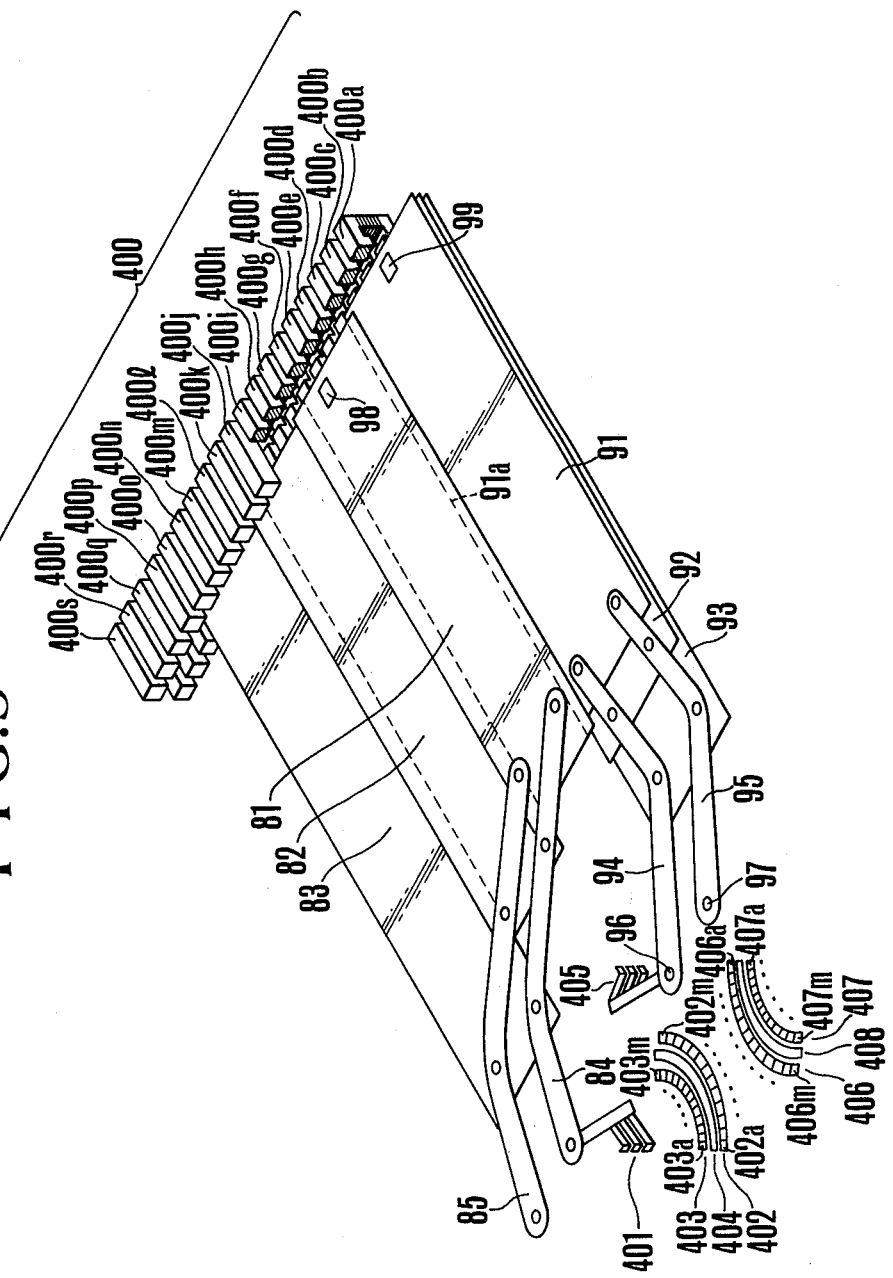

A still further embodiment of the invention is as shown in FIG. 9 which shows it in an exploded oblique view. Each of the front and rear blade groups also comprises a plurality of shutter blades and support arms which form a link mechanism for these blades in a manner similar to the one shown in FIG. 8. A permanent magnet is attached to each blade that has a slit forming side among each of the front and rear groups of blades. The front and rear groups of blades are arranged to be driven by a common driving part. Referring to FIG. 9, among the group of rear blades 91, 92 and 93, the blade 91 is the slit forming blade which is provided with a slit forming side 91a and also with a permanent magnet 99 which is formed into a thin plate shape. The permanent magnet 99 is magnetized in the direction of thickness of the blade with an N pole disposed in the upper part and an S pole disposed in the lower part thereof. Support arms 94 and 95 are pivotally connected to a shutter base plate which is not shown through holes 96 and 97. The rear blades 91, 92 and 93 are rotatably attached to these support arms 94 and 95 by means of pins 94a, 94b, 94c, 95a, 95b and 95c. In the front group of blades, a permanent magnet 98 is attached to the slit forming blade 81. The permanent magnet 98 is magnetized in the direction of thickness of the blade and has a N pole in the upper part and a S pole in the lower part thereof. There is provided the driving part 400 which comprises electromagnets 400a–400s. Each of the electromagnets is provided with a sufficient gap to permit the front blades 81, 82 and 83, the permanent magnet 98, the rear blades 91, 92 and 93 and the permanent magnet 99 to pass therethrough. These electromagnets are arranged along the travelling path of the front blades 81, 82 and 83, the permanent magnet 98, the rear blades 91, 92 and 93 and the permanent magnet 99 to permit them to travel through the inside of these gaps. Each of the electromagnets is arranged to have its upper yoke face become a N pole and its lower yoke face becomes a S pole when a power supply is effected thereto.

Slide switches for driving the front and rear blades are formed by parts 401, 402, 403 and 404 and parts 405, 406, 407 and 408. The power supply to these electromagnets and switching over between them are performed by these slide switches. A slide piece 401 is secured to the support arm 84. A group 402 of exposure effecting pieces include exposure effecting pieces 402a–402m which are connected to the electromagnets 400f–400r respectively through relay switches. A resetting piece group 403 includes resetting pieces 403a–403m which are connected to the electromagnets 400g–400s through switch-over release switches. There is provided a common piece 404 which is connected to the plus power source side of a driving circuit. In another slide switch, a slide piece 405 is secured to the support arm 94. An exposure effecting piece group 406 includes exposure effecting pieces 406a–406m which are connected to the electromagnets 400a–400m through change-over relay switches respectively. A resetting piece group 407 includes resetting pieces 407a–407m which are connected to the electromagnets 400b–400n through change-over relay switches respectively. A common piece 408 is connected to the plus power source side of a driving circuit. The slide pieces 401 and 405 are arranged to slide over the exposure effecting pieces 402 and 406, the resetting pieces 403 and 407 and the common pieces 404 and 408. For effecting an exposure, the exposure effecting piece groups 402 and 406 are used and, for resetting, the resetting piece groups 403 and 407 are used for effecting a power supply to the electromagnet group 400. The switch over between the exposure effecting piece group and the resetting piece group is carried out by a change-over switch which will be described hereinafter. The shutter which is arranged in this manner operates as follows:

The operating principle is almost the same as the embodiment shown in FIG. 7. Under a shutter charging condition, no power supply is effected to the driving part 400. The permanent magnets 98 and 99 are attracted either by the upper or lower yoke faces of the electromagnets 400f and 400a and the front and rear groups of blades are in their held states. Under this condition, the centers of the permanent magnets 98 and 99 are positioned slightly away leftward from the yoke face centers of the electromagnets 400f and 400a by stoppers which are not shown. Further, the slide pieces 401 and 405 are positioned to be in contact with the exposure effecting pieces 402a and 406a respectively. When, in response to a shutter release operation, a power is supplied to the electromagnet 400f, through the exposure effecting piece 402a, the slide piece 401 and the common piece 404, the magnetic poles of the same polarity of the permanent magnet 98 and the electromagnet 400f confront each other to cause the permanent magnet 98 to float in the air. This in turn causes the slit forming blade 81 among the front blade group also to float in the air. Further, since the center of the permanent magnet 98 is away leftward from the yoke face center of the electromagnet 400f, there is produced a force in the horizontal direction. This horizontal force then causes the group of the front blades 81, 82 and 83 to begin to travel. As a result of this travel, when the center of the permanent magnet 98 comes to coincide with the yoke face center of the electromagnet 400g, the slide piece 401 detaches from the exposure effecting piece 402a and comes into contact with the exposure effecting piece 402b. Therefore, the electromagnet 400g is excited and the magnetic poles of the same polarity of the permanent magnet 98 and the electromagnet 400g come to confront each other. Then, with the permanent magnet 98 and the slit forming blade 81 of the front blade group in a state of being afloat, the front blades 81, 82 and 83 continue to travel by inertia. When the center of the permanent magnet 98 comes to deviate from the yoke face center of the electromagnet 400g, there is exerted a horizontal force to increase the travelling speed of the front blades 81, 82 and 83. The electromagnets are thus energized one after another as the slide switch is operated in this manner to allow the front blades 81, 82 and 83. For the last electromagnet 400s, there is provided no corresponding exposure effecting piece and, when the slide piece 401 comes away from the exposure effecting piece 402m, the front blades 81, 82 and 83 continue to travel by inertia. Then, a stopper which is not shown stops the front blades 81, 82 and 83 when the center of the permanent magnet 98 comes to a point slightly away from the yoke face center of the electromagnet 400s on the right hand side thereof. The permanent magnet 98 is attracted by either the upper yoke face or the lower yoke face of the electromagnet 400s and the front blades 81, 82 and 83 are thus kept in their states of being held. Following the commencement of the power supply to the electromagnet 400f for driving the front blades, a predetermined period of time after that, a power supply is effected to the electromagnet 400a by the driving circuit through the exposure effecting piece 406a, the slide piece 405 and the common piece 408. This causes the rear blades 91, 92 and 93 to travel in the same manner as the front blades 81, 82 and 83. The contact of the slide piece 405 changes from one exposure effecting piece to another starting with the piece 406a to energize the electromagnets one after another. However, after the slide piece 405 comes into contact with the exposure effecting piece 406m to energize the electromagnet 400m, when the slide piece 405 moves away from the exposure effecting piece 406, there is no corresponding exposure effecting piece to the next electromagnet 400n. Therefore, the electromagnet 400n is not energized. When the slide piece 405 moves away from the exposure effecting piece 406, the rear blades 91, 92 and 93 travel by inertia until they are stopped by a stopper which is not shown when the center of the permanent magnet 99 comes to a point slightly deviating to the right from the yoke face center of the electromagnet 100n. Then, the permanent magnet 99 is attracted by either the upper yoke face or the lower yoke face of the electromagnet 400n and the rear blades 91, 92 and 93 are kept in their state of being held. Under this condition after completion of the exposure, the slide piece 401 is in contact with the resetting piece 403m and the common piece 404 while the slide piece 405 is in contact with the resetting piece 407m and the common piece 408. Then, the front and rear blades are reset simultaneously. Resetting of the front blades begins when the electromagnet 400s is energized by the driving circuit through the slide piece 401, the resetting piece 403m and the common piece 404. Resetting of the rear blades begins when the electromagnet 400n is energized by the driving circuit through the slide piece 405, resetting piece 407m and the common piece 408. The resetting operations of the front and rear blades are carried out in the same manner as their exposure effecting operations. In resetting the front blades, the electromagnets are energized one after another beginning with the electromagnet 400s. However, the electromagnet 400f has no resetting piece that corresponds thereto and, therefore, is not energized. After the electromagnet 400g is energized with the slide piece 401 coming into contact with the resetting piece 403a, when the slide piece 401 moves away from the resetting piece 403a, the front blades 81, 82 and 83 travels by inertia. When the center of the permanent magnet 98 comes to a point slightly deviating leftward from the yoke face center of the electromagnet 400f, a stopper which is not shown stops the front blades 81, 82 and 83. The permanent magnet 98 is attracted by either the upper yoke face or the lower yoke face of the electromagnet 400f and the front blades 81, 82 and 83 are thus kept in their states of being held. In the case of the rear blades, the electromagnet 400a has no resetting piece corresponding thereto. After the electromagnet 400a is energized with the slide piece 405 coming into contact with the resetting piece 407a, when the slide piece 405 moves away from the resetting piece 407a, the rear blades travel by inertia until they are stopped by a stopper which is not shown at a point where the center of the permanent magnet 99 comes slightly away from the yoke face center of the electromagnet 400a on the left hand side thereof. The permanent magnet 99 then is attracted by either the upper yoke face or lower yoke face of the electromagnet 400a and the rear blades 91, 92 and 93 are thus kept in their states of being held.

In this particular embodiment, although it is omitted from the illustration, there are provided known partition plates between the yoke faces of the driving electromagnets and the front blades, between the front blades and the rear blades and between the rear blades and the yoke faces of the electromagnets.

In all of the embodiments described in the foregoing, when the slide switch arrangement is employed, the position of the permanent magnet relative to the yoke faces of the electromagnets and the timing for effecting the power supply to these electromagnets are adjustable as desired by changing the positions and shapes of the pieces. Where control is to be performed by means of a photo-coupler, the timing for effecting the power supply can be quickened by forming the photo-coupler holes into an oblong shapes or can be retarded by using a delay circuit for the driving circuit.

Figure 10:
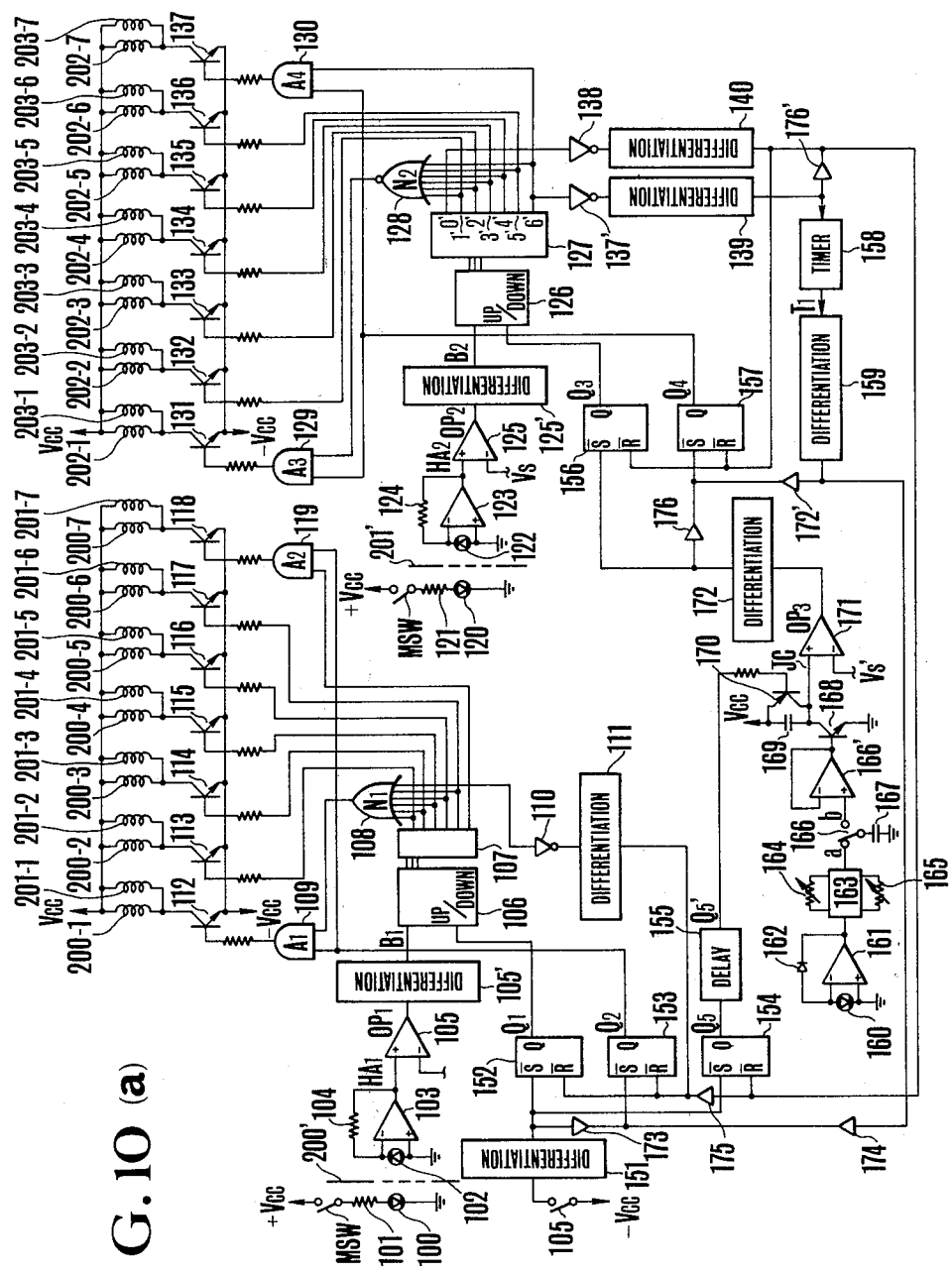
FIG. 10(a) is a circuit diagram of a camera which is equipped with the shutter shown in FIG. 6.
FIG. 10(b) is a timing chart showing the operation of the circuit shown in FIG. 10(a).

The following description covers as embodiment examples the circuit arrangement required for driving the slit exposure shutter of the present invention:

FIG. 10(a) shows the driving circuit of the embodiment shown in FIG. 6. The specifications of this circuit are as follows:

(1) The circuit is intended for use in an aperture preference, automatic exposure type single-lens reflex camera.

(2) A shutter resetting operation is automatically performed by simultaneously resetting the front and rear shutter blades a predetermined short period after completion of the travel of the rear shutter blade.

(3) The position of the shutter blade is first detected by the photo-coupler and, then, the switching-over of the power supply to the electromagnets from one to another is performed in accordance with the output of the photo-coupler.

The structural arrangement of the front shutter blade driving circuit is as described below:

In FIG. 10(a), there are provided a light emitting diode 100 (LED) for forming a photo-coupler; a resistor 101 which is arranged to restrict a current to be supplied to the LED 100; a main switch MSW of the camera; a front shutter blade 200'; a photoelectromotive element or light sensitive element (SPC) 102 arranged to form the photo-coupler; an operational amplifier 103 (hereinafter will be called OP amplifier for short) which serves as SPC head amplifier and which has its two input terminals connected to the above stated SPC 102 with a resistor 104 inserted in its negative feedback route; and another OP amplifier 105 which serves as comparator. The non-inversion input terminal of the OP amplifier 105 is connected to the output terminal of the above stated OP amplifier 103 while the inversion input terminal of the OP amplifier 105 has a reference voltage Vs impressed thereon. A differentiation circuit 105' is connected to the output terminal of the OP amplifier 105 and is arranged to produce a positive differentiation pulse at a rise of the output of the OP amplifier 105. An up-down counter 106 is connected to the output terminal of the differentiation circuit 105'. A reference numeral 107 indicates a decoder which is arranged to convert an input binary code into a decimal code. A numeral 108 indicates a NOR gate which is connected to the output terminals 1-6 of the decoder 107; 109 and 119 indicate AND gates each of which are arranged to have two inputs. One input terminal of the AND gate 109 is connected to the output terminal N1 of the NOR gate 108 while one input terminal of the AND gate 119 is connected to the output terminal 6 of the decoder 107.

There are provided switching transistors 112-118 which are interconnected in parallel with each other. The base of the switching transistor 112 is connected to the output terminal A1 of the AND gate 109 through a resistor. The base terminals of the switching transistors 113-117 are respectively connected through resistors to the output terminals 1-5 of the above stated decoder 107. The base terminal of the switching transistor 118 is connected to the output terminal A2 of the above stated AND gate 119 through a resistor.

A numeral 110 indicates an inversion circuit which is connected to the output terminal 6 of the above stated decoder 107 and has a differentiation circuit 111 connected to the output terminal thereof.

There are arranged the above stated front blade driving electromagnets 200-1-200-7 and 201-1-201-7. The above stated switching transistors 112-118 are respectively loaded with these electromagnets.

Next, the structural arrangement of the rear shutter blade driving circuit is as follows: There is provided a light emitting diode (LED) 120 which is arranged to form a photo-coupler. A numeral 121 indicates a resistor arranged to restrict a current to be supplied to the LED 120. A symbol MSW indicates the main switch of the camera; a numeral 201' indicates a rear shutter blade; 122 indicates a light sensitive element (SPC) which is arranged to form the photo-coupler; 123 indicates an OP amplifier which serves as SPC head amplifier and has the above stated SPC 122 connected to the two input terminals thereof while a resistor 124 is inserted in the negative feedback route thereof; and 125 indicates an OP amplifier which serves as comparator and has its non-inversion input terminal connected to the output terminal of the above stated OP amplifier 123 while its inversion input terminal has a reference voltage level Vs impressed thereon. A differentiation circuit 125' is connected to the output terminal of the OP amplifier 125 and is arranged to produce a positive differentiation pulse at a rise of the output of the OP amplifier. The output terminal of the differentiation circuit 125' is connected to an up-down counter. There is provided a decoder 127 which converts an input BCD code into a decimal code and produces it. The output terminals 1'-6' of the decoder 127 are connected to a NOR gate 128. Numerals 129 and 130 indicate AND gates each of which has two input terminals. One input terminal of the AND gate 129 is connected to the output terminal N2 of the NOR gate 128 while one input terminal of the other AND gate 130 is connected to the output terminal 6' of the above stated decoder 127.

Switching transistors 131-137 are interconnected in parallel with each other. The base of the switching transistor 131 is connected to the output terminal A3 of the above stated AND gate 129 through a resistor. The base terminals of the switching transistors 132-136 are connected respectively through resistors to the output terminals 1'-5' of the above stated decoder 127. Meanwhile, the base terminal of the switching transistor 137 is connected to the output terminal A4 of the above stated AND gate 130 through a resistor.

The output terminal 6' of the above stated decoder 127 is connected to an inversion circuit 137' while a differentiation circuit 139 is connected to the output terminal of the inversion circuit 137'.

There are arranged rear blade driving electromagnets 202-1-202-7 and 203-1-203-7. The above stated switching transistors 131-137 are loaded with these electromagnets respectively. An inversion circuit 138 is connected to the output terminal 0' of the above stated decoder 127 while a differentiation circuit 140 is connected to the output terminal of the inversion circuit 138.

A numeral 150 indicates a switch which closes upon completion of an upward movement of a quick return mirror; and 151 indicates a differentiation circuit; 152, 153 and 154 indicates RS flip-flop circuits. The output terminal of the above stated differentiation circuit 151 is connected to the set input terminals of the RS flip-flop circuit 152 and 154. Further, the set input terminal of the RS flip-flop circuit 153 is arranged to receive the output of the above stated differentiation circuit 151 through a buffer circuit 173. The reset input terminals of the RS flip-flop circuits 152 and 153 are arranged to receive the output of the above stated differentiation circuit 111. The Q output terminal Q1 of the flip-flop circuit 152 is connected to the up-down terminal of the above stated up-down counter 106 while the Q output of the flip-flop circuit 153 is arranged to be supplied to the other input terminals of the above stated AND gates 109 and 119.

A delay circuit 155 is connected to the Q output terminal of the RS flip-flop circuit 154. A numeral 160 indicates a light sensitive element (SPC) provided for TTL full-open light measurement; and 161 indicates an operational amplifier which serves as SPC head amplifier and has the above stated SPC 160 connected to the two input terminals thereof. In the negative feedback route of the operational (OP) amplifier 161, there is inserted a diode 162 for logarithmic suppression. A numeral 163 indicates a known computation circuit; 164 indicates a variable resistor for setting information on the number of stopping down steps of a photograph taking lens; and 165 indicates a variable resistor for setting information on the ASA sensitivity of the film to be used. The output terminal of the computation circuit 163 is arranged to produce a voltage corresponding to the APEX value Tv of the shutter time to which the shutter speed is to be controlled. There is provided a change-over switch 166 which is normally connected to the side a thereof and shifts to another side b in response to the start of an upward movement of the quick return mirror. The output voltage of the above stated computation circuit 163 is stored at a capacitor 167. A voltage follower is formed by an OP amplifier 166'. A transistor 168 for logarithmic extension is connected to the output terminal of the OP amplifier 166'. The collector terminal of the transistor 168 is connected to a time constant capacitor 169. A switching transistor 170 for count starting is connected in parallel with the above stated time constant capacitor 169. The base terminal of the switching transistor 170 is connected to the output terminal Q5' of the above stated delay circuit 155. A comparator is formed by an OP amplifier 171 which has its non-inversion input terminal connected to the collector terminal of the above stated transistor 168 while the inversion input terminal of the OP amplifier 171 has a reference voltage Vs' impressed thereon. The output terminal of the OP amplifier 171 is connected to a differentiation circuit 172.

There are provided RS flip-flop circuits 156 and 157. The set input terminal of the flip-flop circuit 156 is connected to the output terminal of the above stated differentiation circuit 172. The set input terminal of the flip-flop circuit is arranged to receive the output of the above stated differentiation circuit 172 through a buffer circuit 176. Further, the output Q3 of the RS flip-flop circuit 156 is arranged to be supplied to the up-down terminal of the above stated up-down counter 126. The output Q4 of the RS flip-flop circuit 157 is arranged to be supplied to the other input terminals of the above stated AND gates 129 and 130.

A timer circuit 158 is connected to the output terminal of the above stated differentiation circuit 139 and is arranged to be triggered by a negative differentiation pulse produced by the differentiation circuit 139. With the timer circuit 158 triggered, it retains a high level for a predetermined period of time, say, 10 mS. A differentiation circuit 159 is connected to the output terminal of the timer circuit 158. The output of the differentiation circuit 159 is arranged to be supplied to the set input terminal of the above stated RS flip-flop circuit 157 through a buffer circuit 172' and, at the same time, is also arranged to be supplied to the set input terminal of the above stated RS flip-flop circuit 153 through a buffer circuit 174.

The output of the above stated differentiation circuit 140 is arranged to be supplied to the reset input terminals of the above stated RS flip-flop circuits 154, 156 and 157 and is also arranged to be supplied to the reset input terminals of the above stated RS flip-flop circuits 152 and 153 through a buffer circuit 175.

Further, the output of the above stated differentiation circuit 139 is also arranged to be supplied to the reset input terminal of each of the RS flip-flop circuits through a buffer circuit 176'.

Figure 10B:
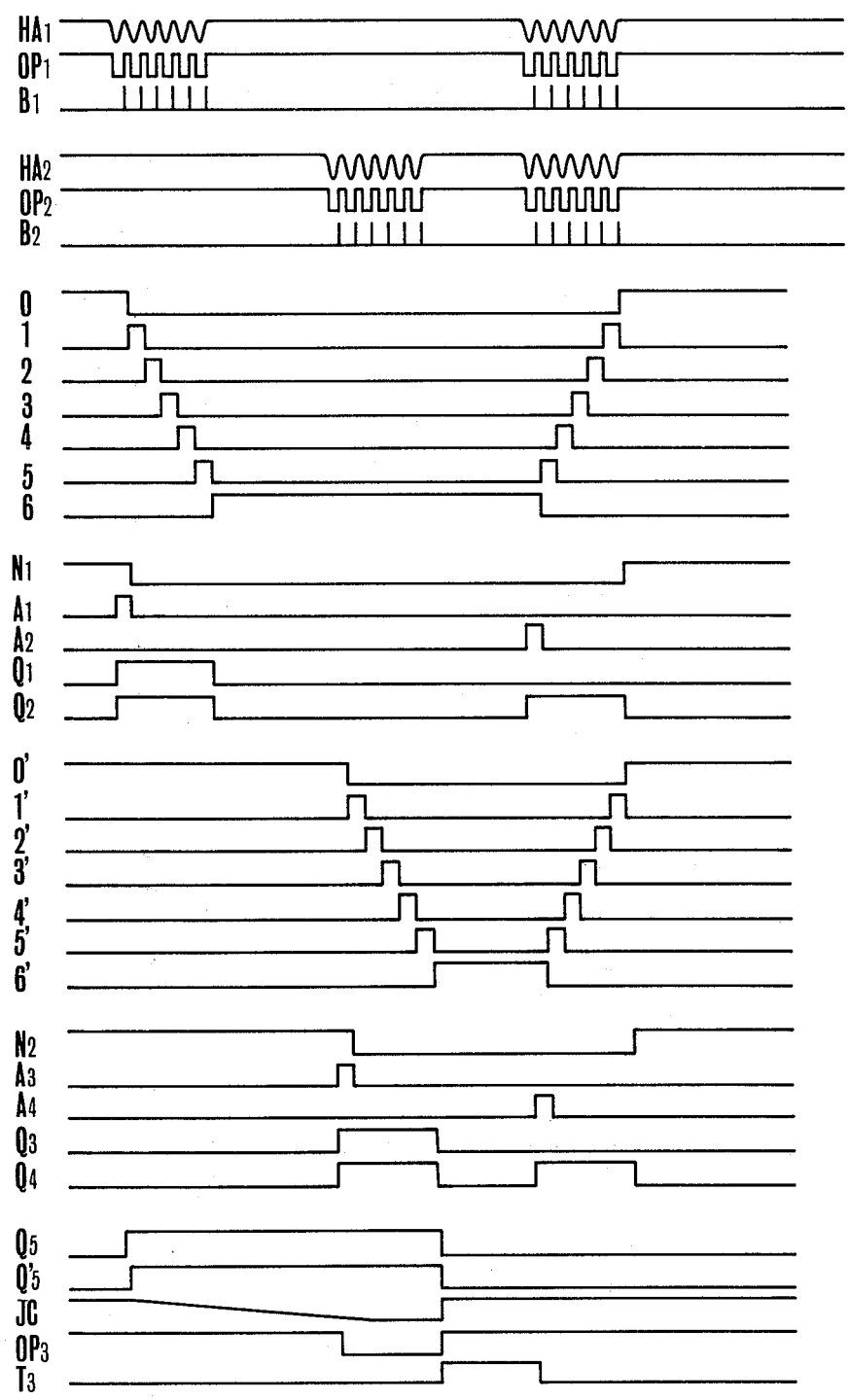

Referring now to the timing chart shown in FIG. 10(b), the circuit arranged as described in the foregoing operates in the following manner:

In FIG. 10(b), reference symbols HA1 and HA2 indicate the outputs of the SPC head amplifiers 103 and 123; OP1 and OP2 indicate the outputs of the OP amplifiers 105 and 125; and B1 and B2 indicate the outputs of the differentiation circuits 105' and 125'.

Further, reference numerals 0-6 and 0'-6' indicate the outputs of the decoders 107 and 127; symbols N1 and N2 indicate the outputs of the NOR gates 108 and 128; A1-A4 indicate the outputs of the AND gates 109, 119, 129 and 130; Q1-Q5 indicate the Q outputs of the RS flip-flop circuits 152, 153, 156, 157 and 154; Q'5 indicates the output of the delay circuit 155; JC indicates the level of the electric charge of the time constant capacitor 169; OP3 indicates the output of the OP amplifier 171; and T1 indicates the output of the timer circuit 158.

With a shutter release operation performed, when the quick return mirror which is not shown completes its upward movement, the switch 150 is closed to cause the differentiation circuit 151 to produce a negative differentiation pulse. This sets the RS flip-flop circuits 152 and 154 and then the RS flip-flop circuit 153 is also set through the buffer circuit 173. The outputs Q1, Q2 and Q3 of the RS flip-flop circuits 152, 153 and 154 change to a high level.

Since the contents of the up-down counter 106 is zero before the travel of the front shutter blade, only the output 0 of the decoder is at a high level while other outputs 1-6 of the decoder 107 are at a low level. Therefore, the output of the NOR gate is at a high level. Since the two inputs of the AND gate 109 then become a high level, the level of the output A1 of the AND gate 109 changes to a high level to turn on the switching transistor 112. A power supply is then effected to the above stated electromagnet coils 200-1 and 201-1 and an exposure effecting action of the front shutter blade begins. The light of the light emitting diode 100 becomes incident upon the light sensitive element 102 every time the hole for the photo-coupler passes through the photo-coupler. In the output HA1 of the OP amplifier 103, there are produced pulses of a wave form as indicated in FIG. 10(b). This wave form is reshaped by the OP amplifier 105 which serves as comparison circuit at the next stage. Then, pulses of a rectangular wave form as shown in FIG. 10(b) are produced in the output OP1 of the OP amplifier 105. In the output B1 of the differentiation circuit 105 disposed at the next stage, there are obtained positive differentiation pulses from the rises of the above stated pulses of the rectangular wave form. The positive differentiation pulses are counted by the up-down counter 106. However, since the output Q1 of the above stated RS flip-flop circuit 152 is at a high level, the up-down terminal of the up-down counter 106 is at a high level. This causes the up-down counter 106 to perform an up count. The up-counted content of the up-down counter 106 is converted into a decimal code by the decoder 107. As shown in FIG. 10(b), the outputs 1-5 of the decoder 107 then alternately become a high level one after another. Then, the switching transistors 113-117 corresponding to these outputs are alternately turned on one after another to effect switching over of the power supply to the electromagnet coils 200-2, 201-2-200-6 and 201-6.

While any one of the outputs 1-6 of the decoder 107 is at a high level, the output A1 of the NOR gate 109 is at a low level to have the switching transistor 112 turned off.

When the front shutter blade comes close to the end of its exposure effecting action and when the output 6 of the decoder 107 changes to a high level, the output of the inversion circuit 110 connected to this output changes to a low level. Then, concurrently with this, the output of the differentiation 111 produces a negative differentiation pulse to reset the RS flip-flop circuits 152 and 153. The outputs Q1 and Q2 of the flip-flop circuits 152 and 153 then change to a low level. Since one input to the AND gate 119 is therefore at a low level, the output of the AND gate 119 remains at a low level and thus does not turn the switching transistor 118 on. Therefore, as mentioned in the foregoing, during the exposure effecting shutter operation, the last electromagnet coils 200-7 and 201-7 do not have any power supply thereto.

The light measuring computation circuit operates in the following manner:

When the switch 150 is closed to change the output Q5 of the RS flip-flop circuit 154 to a high level after completion of the upward movement of the quick return mirror, the output Q'5 of the delay circuit 155 also changes to a high level a little later than that. By this, the count starting switch 170 is turned off. Since there is produced at the output terminal of the computation circuit 163 a voltage corresponding to the APEX value of the shutter time to which the shutter speed should be controlled and the change-over switch 166 is connected to the side a before the commencement of the upward movement of the quick return mirror, the output voltage of the computation circuit 163 is stored at the storage capacitor 167. The position of the change-over switch is shifted to the side b concurrently with the start of the upward movement of the quick return mirror. At the output terminal of the OP amplifier 166' which serves as voltage follower, there is produced a voltage corresponding to the APEX value of the shutter time to which the shutter speed should be controlled. Therefore, when the switching transistor 170 which is provided for starting a count is turned off, the capacitor 169 which is provided for a time constant purpose is charged with current obtained by logarithmic extension of the output voltage of the above stated OP amplifier 166'. When the charging level Jc of the capacitor 169 becomes lower than the reference level Vs' impressed on the inversion input terminal of the OP amplifier 171, the output of the OP amplifier 171 changes to a low level. The differentiation circuit 172 which is disposed at the next stage produces a negative differentiation pulse, which sets the RS flip-flop circuit 156. Then, concurrently with this, the RS flip-flop circuit 157 is also set through the buffer circuit 176. The Q outputs Q3 and Q4 of these flip-flop circuits then change to a high level.

Since the content of the up-down counter 126 is zero before the beginning of the exposure effecting operation of the rear shutter blade, only the output 0' of the decoder 127 is at a high level while all of the other outputs 1'-6' of the decoder are at a low level. Before the start of the exposure effecting operation of the rear shutter blade, therefore, the output N2 of the NOR gate 128 is at a high level. Concurrently with the change of the Q output Q4 of the above stated RS flip-flop circuit 157 to a high level, the output A3 of the AND gate 129 changes to a high level to turn on the switching transistor 131. With the switching transistor 131 turned on, the first pair of electromagnet coils 202-1 and 203-1 are energized to cause the rear shutter blade to begin its exposure effecting operation. Then the hole for the photocoupler comes to pass the photo-coupler to produce a signal. The power supply to the driving electromagnets is switched over from one electromagnet to another by this signal. The operation of the circuit for this switching over operation on the power supply is identical with the switching over operation performed for the front shutter blade. The pulses produced at the output HA2 of the OP amplifier 123 is shaped into a rectangular wave form by the operational amplifier which serves as comparator at the next stage. Then, from the rises of the rectangular wave, positive differentiation pulses are obtained at the differentiation circuit 125' disposed at the next stage. The pulses thus obtained are counted by the up-down counter 126 disposed at the next stage. Since the up-down terminal of the counter 126 is at a high level, the outputs 1'-5' of the decoder 127 alternately become a high level as shown in FIG. 10(b). Then, the switching transistors 132-136 are turned on one after another to drive the rear shutter blade thereby. Further, when any of the outputs 1'-6' of the decoder 127 is at a high level, the output N2 of the NOR gate 128 is at a low level. Then, the output A3 of the AND gate 129 is also at a low level to have the switching transistor 131 turned off.

When the rear shutter blade comes close to the end of the exposure effecting operation and when the output 6' of the decoder 127 comes to be of a high level, the output of the inversion circuit 137' changes to a low level to cause the differentiation circuit 139 to produce a negative differentiation pulse, which resets the RS flip-flop circuits 156 and 157 to change their Q outputs Q3 and Q4 to a low level. Since the one input to the AND gate 130 is therefore at a low level, the output A4 of the AND gate 130 also remains at a low level. The switching transistor 137 is therefore not turned on. Accordingly, there is no power supply to the last pair of the electromagnet coils 202-7 and 203-7. Further, with the output 6' of the decoder 127 changed to a high level, when the negative differentiation pulse is produced from the differentiation circuit 139, the timer circuit 158 is triggered thereby and the output T1 of the timer circuit is kept at a high level for a predetermined period of time, say, 10 mS. When, the output T1 of the timer circuit 158 returns to a low level, the differentiation circuit 159 disposed at the next stage produces a negative differentiation pulse which comes to set the RS flip-flop circuit 157 through the buffer circuit 172' and also set the RS flip-flop circuit 153 through the buffer circuit 174. This causes the Q outputs Q2 and Q4 of the RS flip-flop circuit 153 and 157 to change to a high level. Accordingly, the two inputs of the AND gates 119 and 130 change to a high level. The outputs A2 and A4 of the AND gates 119 and 130 then change to a high level to turn on the switching transistors 118 and 137. With the switching transistors 118 and 137 turned on, the power supply is effected to the coils 200-7, 201-7, 202-7 and 203-7 to cause the resetting operations on the front and rear shutter blades to begin simultaneously. When the resetting operations begin, the outputs B1 and B2 of the differentiation circuits 105' and 125' produce positive differentiation pulses every time the holes for the photo-couplers pass the fronts of the photo-couplers. Then, the Q outputs Q1 and Q3 of the RS flip-flop circuits 152 and 156 change to a low level. The pulses are then down counted by the up-down counters 106 and 126. The outputs of the decoders 107 and 127 disposed at the next stage then alternately become a high level in sequence from the output 6 to the output 1 and from the output 6' to the output 1'. The switching transistors 132-136 and the switching transistors 113-117 are then alternately turned on one after another beginning with the transistors 136 and 117 and ending with the transistors 132 and 113. The electromagnets are also alternately energized one after another to perform the resetting operations on the front and rear shutter blades.

When the front and rear shutter blades come close to the end of the resetting operations, the outputs O and O' of the decoders 107 and 127 become a high level. Then, the output of the inversion circuit 138 changes to a low level to cause the differentiation circuit 140 to produce a negative differentiation pulse. The RS flip-flop circuits 156, 157 and 154 are reset and, at the same time, the RS flip-flop circuits 152 and 153 are also reset through the buffer circuit 175. The Q outputs Q2 and Q4 of the RS flip-flop circuits 153 and 157 change to a low level. Since the outputs 1-6 and 1'-6' of the decoders 107 and 127 are at a low level under this condition, the outputs N1 and N2 of the NOR gates 108 and 128 are at a high level. However, since the Q outputs Q2 and Q4 of the above stated RS flip-flop circuits 153 and 157 are at a low level then, the outputs A1 and A3 of the AND gates 109 and 129 remain at a low level. Therefore, the switching transistors 112 and 131 are not turned on and thus no power supply is effected to the last pairs of electromagnet coils 200-1, 201-1, 202-1 and 203-1. With this, one sequence of operations of the electromagnetically operated shutter of this embodiment example is completed.

Further, in the circuit arrangement described in the foregoing, the provision of the timer circuit 158 gives some time interval between the completion of the exposure effecting operation of the rear shutter blade and the commencement of the front and rear shutter blade resetting operations, so that the resetting operations can be started when the shutter is stabilized after completion of the exposure effecting operation of the rear shutter blade.

As described in the foregoing, under the conditions before the start of the operations of the front and rear shutter blades and after the completion of their operations, the photo-couplers and the holes for the photo-couplers are arranged to have the lights of the light emitting diodes incident upon the light sensitive elements (SPC).

Figure 11:
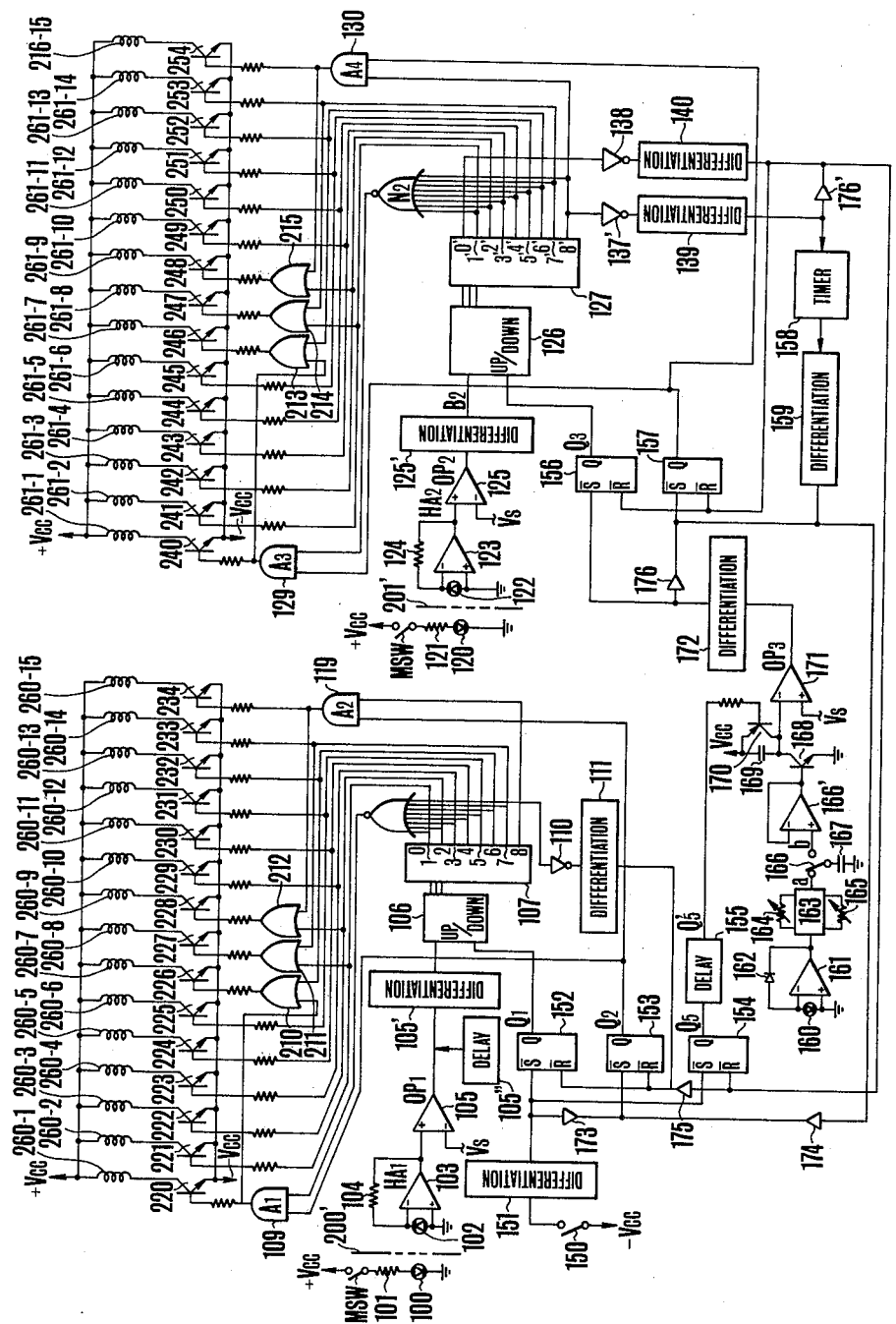
FIG. 11 is a circuit diagram of a camera equipped with the shutter shown in FIG. 7.

The driving circuit of the embodiment wherein the shutter blades are driven by another type of electromagnet arrangement shown in FIG. 7 is as shown in FIG. 11. The arrangement shown in FIG. 11 is in most part identical with the circuit arrangement shown in FIG. 10(a). Therefore, like parts are indicated by like reference numerals and symbols.

Reference numerals 210-212 indicate OR gates each having two inputs. The OR gate 210 is arranged to have the output A1 of the AND gate 109 and the output 6 of the decoder 107 supplied thereto. The outputs 1 and 7 of the decoder 107 are supplied to the OR gate 211. Another OR gate 212 is arranged to have the output 2 of the decoder 107 and the output A2 of the AND gate 119 supplied thereto. There are provided switching transistors 220-234 which are arranged to control the power supply to the front blade driving electromagnets. The bases of the switching transistors 220 and 234 are connected to the outputs A1 and A2 of the AND gates 109 and 119 through resistors. The bases of the switching transistors 221-225 are connected to the outputs 1-5 of the decoder 107 through resistors respectively. The bases of the switching transistors 226-228 are connected also through resistors to the output terminals of the above stated OR gates 210, 211 and 212. The bases of the switching transistors 229-233 are connected to the outputs 3-7 of the decoder 107 through resistors respectively. The collectors of the switching transistors 220-234 are respectively connected to the coils 260-1-260-15 of the above stated front blade driving electromagnets.

Numerals 213-215 indicate OR gates each having two inputs. The OR gate 213 is arranged to have the output A1 of an AND gate 129 and the output 6 of a decoder 127 supplied thereto. The OR gate 214 is arranged to have the outputs 1 and 7 of the decoder 127 supplied thereto while the OR gate 215 is arranged to have the output 2 of the decoder 127 and the output A2 of an AND gate 130 supplied thereto. There are provided switching transistors 240-254 for controlling a power supply to the front blade driving electromagnets. The bases of the switching transistors 240 and 254 are connected through resistors to the output terminals A3 and A4 of the above stated AND gates 129 and 130. The bases of the switching transistors 241-245 are connected through resistors to the output terminals 1-5 of the decoder 127. The bases of the transistors 246-248 are connected to the output terminals of the above stated OR gates 213-215 through resistors. The bases of other switching transistors 249-253 are connected through resistors to the output terminals 3-7 of the decoder 127. The coils 261-1-261-15 of the above stated rear blade driving electromagnets are respectively connected to the collectors of the switching transistors 240-254.

Between an OP amplifier 105 and a differentiation circuit 105', there is inserted a delay circuit 105''. To enhance driving efficiency, the delay time constant of the delay circuit 105'' may be arranged to be adjustable to permit adjustment of the position of the shutter blade at the point of time at which signals from the photo-coupler are counted.

The operation of the circuit which is arranged as described in the foregoing is about the same as the circuit shown in FIG. 10(a). Therefore, the following description covers only the different points of the circuit from the circuit of FIG. 10(a):

In the exposure effecting operation of the front shutter blade, when the output A1 of the AND gate 109 and the outputs 1-8 of the decoder 107 alternately change to a high level one after another, the pairs of switching transistors 220 and 226, 221 and 227, 222 and 228, ... and 227 and 233 are turned on one after another to effect a power supply to the pairs of the coils of the electromagnets 260-1 and 260-7, 260-2 and 260-8, 260-3 and 260-9, ... and 260-8 and 260-14 one after another. With the coils energized in this manner, the front shutter blade performs its exposure effecting operation. At the end of the exposure effecting operation, the switching transistors 228 and 234 are not turned on and no power supply is effected to the last pair of the electromagnet coils 260-9 and 260-15 in the same manner as in the circuit of FIG. 10(a). The exposure effecting operation of the rear shutter blade is performed in the same manner as in the case of the front shutter blade.

In resetting the front shutter blade, when the output A2 of the AND gate 119 and the outputs 8-0 of the decoder change to a high level alternately one after another, the pairs of the switching transistors 228 and 234, 227 and 233, 226 and 232, ... and 221 and 227 are turned on, one pair after another, to effect a power supply to the pairs of the electromagnet coils 260-9 and 260-15, 260-8 and 260-15, 260-8 and 260-14, 260-7 and 260-13, ... and 260-2 and 260-8. With the coils thus energized, the resetting operation on the front shutter blade is performed. At the end of the resetting operation on the front shutter blade is performed. At the end of the resetting operation, in the same manner as in the circuit shown in FIG. 10(a), the switching transistors 220 and 226 are not turned on and no power is supplied to the coils of the last stage 260-1 and 260-7. The resetting operation on the rear blade is performed in the same manner. Therefore, it is omitted from description here.

Figure 12A:
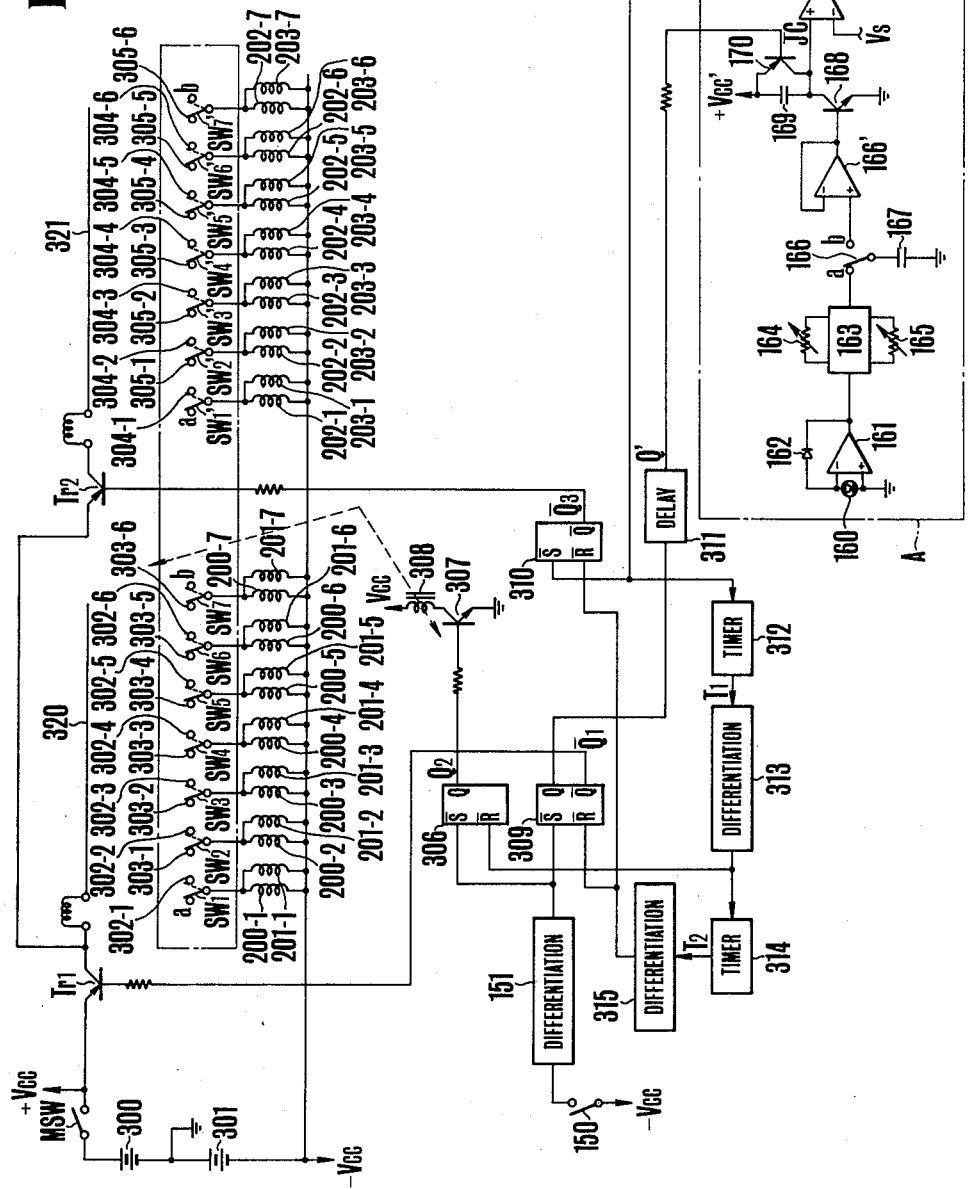
FIG. 12(a) is a circuit diagram of a camera equipped with the shutter shown in FIG. 1.

FIG. 12(a) shows the driving circuit of the embodiment shown in FIG. 1 in which slide switches are arranged to detect the positions of the shutter blades and a power supply to the coils of electromagnets is switched over from one coil to another. Referring now to FIG. 12(a), reference numerals 300 and 301 indicate power source batteries which are interconnected in series with the connection point grounded. A symbol MSW indicates the main switch of the camera; Tr1 indicates a switching transistor which is arranged to control the power supply to the electromagnets for driving the front shutter blade; and Tr2 is another switching transistor which is arranged to control the power supply to the electromagnets for driving the rear shutter blade. There are provided the exposure effecting divided pieces 302-1–302-6 of the slide switch for the front shutter blade and the resetting divided pieces 303-1–303-6 of the slide switch. The exposure effecting pieces and the resetting pieces are arranged on different phases. The slide switch is provided with a common piece 320. Numerals 200-1–200-7 and 201-1–201-7 indicate the above stated coils of the front driving electromagnets. There are provided relay switches SW1–SW7 which are interlocked with an electromagnet, which will be described hereinafter. Each of the relay switches is connected to one side a as shown by a full line when the electromagnet 308 is not energized and to another side b as shown by a broken line when the electromagnet 308 is energized. Numerals 304-1–304-6 indicate another set of exposure effecting divided pieces and 305-1–305-6 indicate another set of resetting divided pieces. These sets of pieces are arranged on different phases. A numeral 321 indicates a common piece of the slide switch for the rear shutter blade. Numerals 202-1–202-7 and 203-1–203-7 indicate coils of electromagnets for driving the rear shutter blade. Symbols SW1'–SW7' indicate relay switches interlocked with an electromagnet which will be hereinafter described. Each of these relay switches is arranged to be connected to one side a when the electromagnet 308 is not energized and to another side b when the electromagnet 308 is energized. There is provided a switch 150 which is arranged to close upon completion of an upward movement of a quick return mirror. With the switch 150 closed, a differentiation circuit 151 produces a negative differentiation pulse. Numerals 306 and 309 indicate RS flip-flop circuits. The set input terminals of these flip-flop circuits 306 and 309 are connected to the output terminal of the differentiation circuit 151. A numeral 307 indicates a switching transistor, the base of which is connected through a resistor to the Q output Q2 of the above stated RS flip-flop circuit 306. The collector of the switching transistor 307 is connected to the above stated electromagnet which is interlocked with the above stated relay switches SW1–SW6 and SW1'–SW6' respectively. A numeral 311 indicates a delay circuit which is connected to the Q output of the above stated RS flip-flop circuit 309. The output terminal Q' of the delay circuit 311 is connected to the base of a switching transistor 170 which is provided within a light measurement computation circuit A for count starting.

A numeral 310 indicates an RS flip-flop circuit which has its set input terminal connected to the output terminal of a differentiation circuit 172 provided within the light measurement computation circuit A. A timer circuit 312 is connected to the output terminal of the differentiation circuit 172 and is arranged to be triggered by a negative differentiation pulse produced by the differentiation circuit 172 to be thus kept at a high level for a predetermined period of time, say, 20 mS. A differentiation circuit 313 is connected to the output terminal of the timer circuit 312 and is arranged to have its output supplied to the reset terminal of the above stated RS flip-flop circuit 306. The output terminal of the differentiation circuit 313 is also connected to the trigger input terminal of a timer circuit 314. The timer circuit 314 is arranged to be triggered by a negative differentiation pulse produced from the above stated differentiation circuit 313 to be thus kept at a high level for a predetermined period of, say, 20 mS. A differentiation circuit 315 is connected to the output terminal of the timer circuit 314 and is arranged to have its output supplied to the reset terminals of the above stated RS flip-flop circuits 309 and 310. Meanwhile, the $\bar{Q}$ outputs $\bar{Q}1$ and $\bar{Q}3$ of the RS flip-flop circuits 309 and 310 are connected through resistors to the bases of the above stated switching transistors Tr1 and Tr2.

The circuit arranged as described in the foregoing operates as outlined by the timing chart given in FIG. 12(b).

When the switch 150 is closed upon completion of the upward movement of the quick return mirror which is not shown, the output terminal of the differentiation circuit 151 produces a negative differentiation pulse. The RS flip-flop circuits 306 and 309 are set by this. The Q output Q2 of the flip-flop circuit 306 changes to a high level and the Q output and the $\bar{Q}$ output $\bar{Q}1$ of the flip-flop circuit 309 respectively change to a high level and a low level. This causes the above stated switching transistor Tr1 to turn on. Then, at the same time, the switching transistor 307 turns on to energize the electromagnet 308. Each of the above stated relay switches SW1–SW6 and SW1'–SW6' is switched over to the side b shown by a broken line. Since, before the travelling operation of the front shutter blade, the slide piece (5 in FIG. 5) of the slide switch which is connected to the front shutter blade is located on the exposure effecting divided piece 302-1, a power supply is effected through the relay switch SW1 to the first pair of electromagnet coils 200-1 and 201-1 to cause the front shutter blade to begin its travel. After that, the slide piece connected to the front shutter blade makes a sliding movement over the exposure effecting divided pieces 302-1–302-6 one after another to effect the power supply through the relay switches SW1–SW6 to the electromagnet coils 200-1, 201-1–200-6 and 201-6. The front shutter blade is driven in this manner.

Under the condition of having the front shutter blade completed its travel, the slide piece is away from the exposure effecting divided piece 302-6 as mentioned in the foregoing and is in contact with the resetting divided piece 303-6. However, since the relay switch SW7 is connected to its side b, no power supply takes place to the electromagnet coils 200-7 and 201-7 located at the last stage.

Further, when the above stated RS flip-flop circuit 309 is set and its Q output is changed to a high level, the output Q' of the delay circuit 311 changes to a high level a little later than the Q output of the flip-flop circuit 309. This causes the above stated switching transistor 170 to turn off. The time constant capacitor comes to be charged with a current corresponding to a light measurement computed value and the charge level JC of the capacitor decreases as shown in FIG. 12(b). When this charge level becomes lower than the inversion input level Vs of the OP amplifier 171, the output OP of the OP amplifier 171 changes to a low level to cause the differentiation circuit 172 disposed at the next stage to produce a negative differentiation pulse. The RS flip-flop circuit 301 is set and its $\bar{Q}$ output $\bar{Q}3$ changes to a low level to cause the switching transistor Tr2 to turn on. Before the travelling operation of the rear shutter blade, the slide piece connected to the rear shutter blade is in contact with the exposure effecting divided piece 304-1. Therefore, when the above stated switching transistor Tr2 turns on, a power supply is effected through the relay switch SW1' to the first pair of electromagnet coils 202-1 and 203-1 to cause the rear shutter blade to begin its travel. Then, the slide piece which is not shown but is connected to the rear shutter blade makes a sliding movement over the exposure effecting pieces 304-1–304-6 one after another to switch over the power supply through the relay switches SW1'–SW6' to the electromagnet coils 202-1, 203-1–202-6 and 203-6 one after another. The rear shutter blade is driven in this manner.

Under the condition of having the rear shutter blade completed its travel, as mentioned in the foregoing, the slide piece (not shown) is detached from the exposure effecting piece 304-6 and is in contact with the resetting divided piece 305-6. However, since the relay switch SW7' is then connected to the side b, no power supply takes place to the last electromagnet coils 202-7 and 203-7.

When a negative differentiation pulse is produced from the differentiation circuit 172 disposed within the light measurement circuit A, the timer circuit 312 is triggered by the pulse and retains its output T1 at a high level for a predetermined period of, say, 20 mS. Then, by the falling to a low level thereof, the differentiation circuit 313 is caused to produce a negative differentiation pulse, which resets the above stated RS flip-flop circuit 306 to cause the Q output Q2 of the flip-flop circuit 306 to change to a low level. Accordingly, the above stated switching transistor 307 is turned off to render the electromagnet 308 not energized. This causes each of the above stated relay switches SW1–SW7 and SW1'–SW7' to shift to the side a as indicated by a full line. Since the slide piece which is connected to the front shutter blade and the other slide piece which is connected to the rear shutter blade are both located on the resetting divided pieces 303-6 and 305-6 respectively, the power supply is effected to the front blade driving electromagnet coils 200-7 and 201-7 and also to the rear blade driving electromagnet coils 202-7 and 203-7 respectively. The front and rear shutter blades thus begin their resetting movements. The slide pieces connected to the front and rear shutter blades respectively make sliding movements over the resetting divided pieces 303-6–303-1 and 305-6–305-1 to effect a power supply to each of the front blade driving electromagnet coils 200-7, 201-7–200-1 and 201-1 and the rear blade driving electromagnet coils 202-7, 203-7–202-1 and 203-1 through the relay switches SW6–SW1 and SW6'–SW1' one after another. The resetting operation on the front and rear shutter blades is performed in this manner.

Under the condition of having the front and rear shutter blades completed their resetting travels, one of the slide pieces is detached from the resetting divided piece 303-1 and is in contact with the exposure effecting divided piece 302-1 as mentioned in the foregoing while the other slide piece is also away from the resetting divided piece 305-1 and is in contact with the exposure effecting divided piece 304-1. Therefore, the relay switches SW1 and SW1' are connected to the side a as indicated by the full line. Therefore, during the resetting operation, no power supply is effected to the last electromagnet coils 200-1, 201-1, 202-1 and 203-1.

As mentioned in the foregoing, when a negative differentiation pulse is produced from the differentiation circuit 313, the timer circuit 314 which is located at the next stage is triggered to keep its output at a high level for a predetermined period of, say, 10 mS. Then, a fall of the output of the timer circuit 314 causes the differentiation circuit 315 to produce a negative differentiation pulse, which resets the above stated RS flip-flop circuits 309 and 310 to cause their $\bar{Q}$ outputs $\bar{Q}1$ and $\bar{Q}3$ to change to a high level. This in turn causes the switching transistors Tr1 and Tr2 to turn off.

As apparent from the foregoing description, the length of time for which the output T1 of the timer circuit 312 is kept at a high level is preset in such a manner as to allow the rear shutter blade to complete its exposure effecting operation. Meanwhile, the length of time for which the other timer circuit 314 keeps its output T2 at a high level is preset in such a manner as to sufficiently allow the front and rear shutter blades to complete their resetting movements.

The driving circuit of the electromagnetically driven shutter inforporating the electromagnetic device shown in FIG. 8 can be arranged with only a minor modification to the driving circuit shown in FIG. 11. Therefore, the driving circuit of the electromagnetic device shown in FIG. 8 is not separately illustrated. In the driving circuit shown in FIG. 11, the electromagnet coils 260-1–260-15 (or 261-1–261-15) are arranged to be energized in pairs by pairing each coil with every sixth coil. In the case of the driving circuit for the electromagnetic device shown in FIG. 8, however, the energization of electromagnetic coils is arranged to be effected by pairing each coil with every third coil instead of sixth one.

Figure 13:
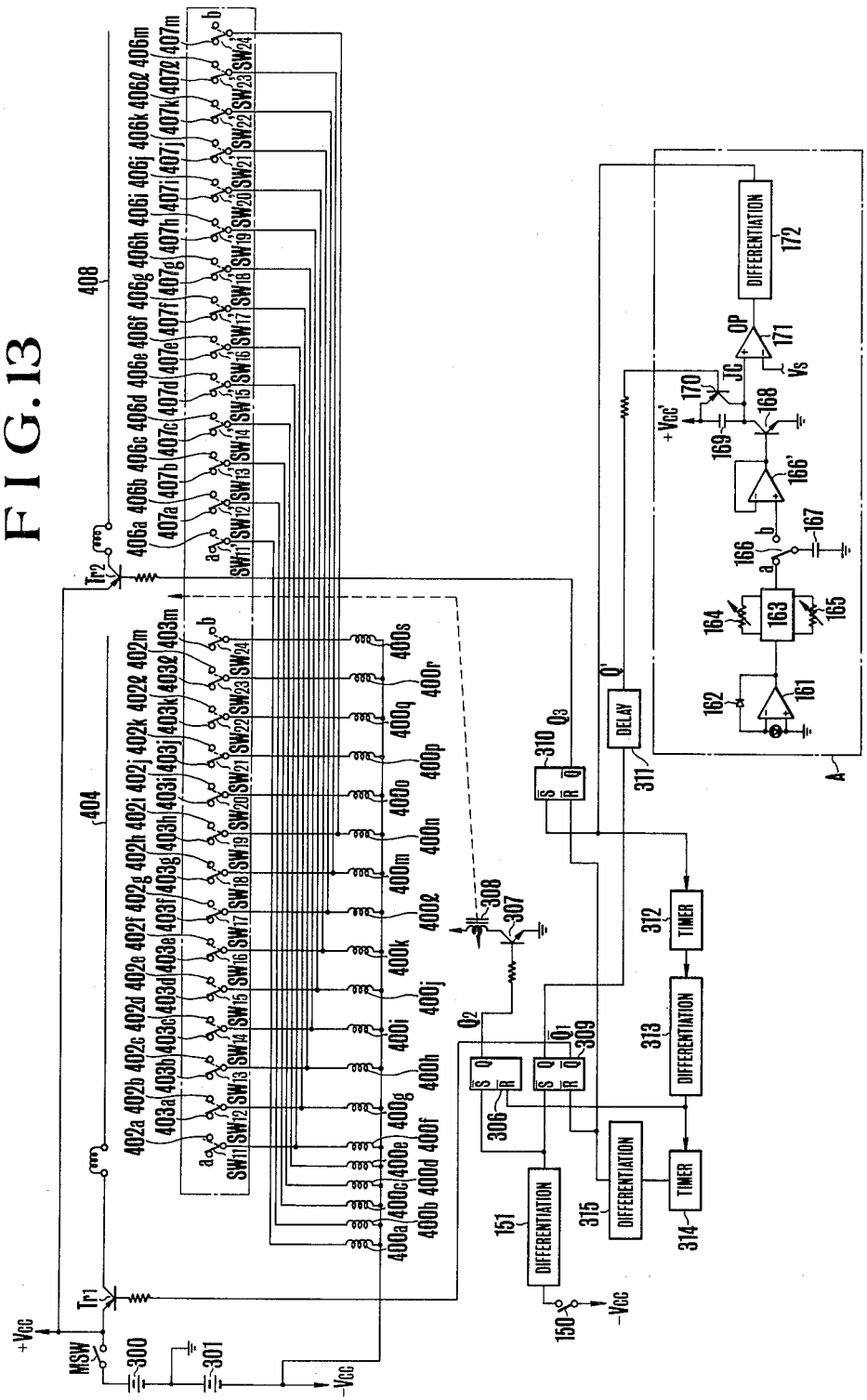
FIG. 13 is circuit diagram showing a camera equipped with the shutter shown in FIG. 9.

Next, FIG. 13 shows a driving circuit of the embodiment shown in FIG. 9 wherein the positions of the shutter blades are detected by slide switches; the power supply to electromagnet coils is switched over from one to another coil by the slide switch arrangement; and the electromagnets are arranged to be used in common for driving the front and rear shutter blades.

In FIG. 13, the exposure effecting pieces 402a–402m for the front shutter blades are connected to the sides b of the change-over switches SW11–SW23 respectively. Meanwhile, the resetting pieces 403a–403m are connected to the sides a of the change-over switches SW12–SW24. Further, the exposure effecting pieces 406a–406m for the rear shutter blades are connected to the sides b of the change-over switches SW11'–SW23' while the resetting pieces 407a–407m are connected to the sides a of the change-over switches SW12'–SW24'.

The common terminal of the above stated change-over switches SW11–SW24 is connected to the coils of the above stated electromagnets 91f–91s. The common terminal of the above stated change-over switches SW11'–SW24' is connected to the coils of the above stated electromagnets 91a–91n respectively.

The change-over switches SW11–SW14 and SW11'–SW14' are arranged to serve as relay switches interlocked with an electromagnet 308. Each of these switches is connected to the side a thereof when the above stated electromagnet 308 is not energized and to the side b when the electromagnet 308 is energized. Other details of the circuit arrangement and the operation thereof are identical with those of the circuit shown in FIG. 12(a) and, therefore, are omitted from description here.

The slide switch for the front shutter blades operates in the same manner as in the circuit shown in FIG. 12(a). Upon completion of the upward movement of the mirror, the switching transistor 307 turns on. The electromagnet 308 is excited. The change-over switches SW11–SW24 and SW11′–SW24′ are all connected to the sides b (shown by broken lines). When the switching transistor Tr1 is turned on, the coil of the electromagnet 100f receives a power supply. The front shutter blades begin their exposure effecting operation. This causes the slide switch to operate. The power supply is effected to the electromagnets 400g–400r one after another to complete the exposure effecting operation of the front shutter blades.

The rear shutter blades operate in the same manner. The power supply is effected to the coils of the electromagnets 400a–400m one after another for the exposure effecting operation of the rear shutter blades. In resetting the shutter blades, the above stated switching transistor 307 is turned off. The electromagnet 308 comes into a non-excited state. The change-over switches SW11–SW24 and SW11′–SW24′ shift their positions to the sides a (shown by full lines). The resetting operation on the front shutter blades is carried out by effecting the power supply to the coils of the electromagnets 400g–400s one after another starting with the electromagnet 400s and ending with the electromagnet 400g. The resetting operation on the rear shutter blades is carried out by effecting the power supply to the coils of the electromagnets one after another in the sequence from the electromagnet 400n to the electromagnet 400b.

As described in detail in the foregoing, the invented slit exposure shutter employs an electromagnetic driving device instead of the conventional spring arrangement. The invention, therefore, dispenses with the charge and release mechanisms. Although the electromagnetic driving device is simple in structural arrangement, the shutter blades can be effectively prevented from any inadvertently caused displacement thereof while the shutter is not energized or while the camera is being carried or stored. Further, in accordance with the invention, the magnetic arrangement to float the shutter blades lessens the friction of the shutter during its travel, so that the shutter can be allowed to travel at a sufficiently high speed even when the driving force available from a small battery is insufficient. To further lessen the friction, a non-contact type detector (a photocoupler) is used for detecting the positions of the shutter blades; and, in addition to the driving side, a magnetic floating means is additionally provided also on the guide side. To simplify the structural arrangement, a common group of coils is arranged to be used for driving both the front and rear shutter blades. In accordance with the present invention, despite of the simple structural arrangement, these advantages are attainable in addition to such intrinsic advantages of an electromagnetically driven type shutter that there is a less distance between the front and rear shutter blades in the direction of the optical axis and that reciprocating actions can be performed with provision of a single source of a driving force.

While preferred embodiments of the invention have been described in the foregoing with reference to the accompanying drawings, such description is for illustrative purposes. It is to be understood that changes and variations may be made without departing from the spirit or scope of the invention.

What is claimed is:

1. A slit exposure shutter arranged to have front and rear shutter blades driven by an electromagnetic drive source so as to travel to effect an exposure and for returning to their original positions, said shutter comprising:
   front and rear shutter blades each of a light shielding non-magnetic material formed into a thin plate shape, said shutter blades having thin-plate shaped permanent magnets secured thereto and disposed in the travel direction thereof;
   guide means for allowing said front and rear shutter blades to travel along a predetermined path;
   a plurality of electromagnets disposed on both sides of the passage of said permanent magnets and arranged to have their magnetic poles confront the magnetic poles of said permanent magnets; and
   a power supply means for exciting said electromagnets one after another as the front and rear shutter blades travel and to excite each of said electromagnets into the same polarity as that of the permanent magnets confronting them to produce repellent forces between the permanent magnets and the electromagnets and cause said front and rear shutter blades to float and travel through the gaps between the magnetic poles of said electromagnets in alignment, said electromagnets each having temporarily magnetizable yokes for attraction between said permanent magnets and said yokes when said electromagnets are unenergized so as to prevent movement in the blades when said electromagnets are unenergized.

2. A slit exposure shutter according to claim 1, wherein each of said front and rear shutter blades comprises a plurality of thin plate component members interlocked with each other; and wherein said thin plate shaped permanent magnet is attached only to the component member of each of said front and rear shutter blades that has an exposure slit forming end.

3. A slit exposure shutter according to claim 1 wherein each of said thin plate shaped permanent magnets is disposed at one end of the shutter blade while a second thin plate shaped permanent magnet is attached to the other end of said shutter blade; and there is provided a third permanent magnet which produces magnetic poles of polarity opposite to that of the second permanent magnet on both sides confronting the magnetic poles of said second permanent magnet.

4. A slit exposure shutter according to claim 3 wherein said second permanent magnet is formed into a shape protruding over the shutter blade and is arranged to guide said shutter blade in cooperation with said guide means.

5. A slit exposure shutter according to claim 1 wherein said thin plate shaped permanent magnet is magnetized in the travel direction of said shutter blades.

6. A slit exposure shutter according to claim 1 wherein said thin plate shaped permanent magnet is magnetized in the direction of the thickness of said shutter blade.

7. A slit exposure shutter according to claim 1, further including switchover control means for deenergizing the electromagnet disposed at an exposure effecting travel ending part during the exposure effecting travel of said shutter blades and for deenergizing the electromagnet disposed at a return travel ending part during the return travel of said shutter blades.

8. A slit exposure shutter according to claim 1, further comprising stopping means for stopping said shutter blades at predetermined stopping positions upon completion of their exposure effecting travel and upon completion of their return travel; and, with said shutter blades in said stopping positions, said permanent magnets are arranged relative to the magnetic poles of said electromagnets so that when the electromagnets are excited propelling forces are produced between the permanent magnets and the electromagnets in the travel direction of the shutter blades.

9. A slit exposure shutter according to claim 1 further including detecting means for detecting the travel positions and the stopping positions of said front and rear shutter blades, the output of said detecting means being arranged to control said power supply means effecting a power supply to said electromagnets to excite said electromagnets one after another.

10. A slit exposure shutter, comprising:
front shutter blade means and rear shutter blade means movable into and out of a light passage for blocking light through the passage;
a plurality of permanent magnet means mounted on the front shutter blade means and the rear shutter blade means for movement along a predetermined travel path;
a plurality of electromagnets disposed along the path and having magnetic poles which form a gap through which said permanent magnet means pass as they move along the path so that the magnetic poles of the electromagnets confront the poles of the permanent magnet means; and
supply means for energizing said electromagnets which cause the poles of the electromagnets to repel the permanent magnet means as said permanent magnet means pass through the gaps and cause said front shutter blade means and said rear shutter blade means to float as they travel through the gaps of the electromagnets, said electromagnets being arranged to attract the magnetic poles of said permanent magnet means when said electromagnets are not excited and to inhibit travel of said front shutter blade means and said rear shutter blade means.

11. A shutter as in claim 10, wherein
said front shutter blade means and said rear shutter blade means each includes a plurality of thin-plate component members interlocked with each other, a component member of each of said blade means having an exposure slit forming end; and wherein
said permanent magnet means is mounted only on the component member of each of said front shutter blade means and said rear shutter blade means having an exposure slit forming end.

* * * * *